United States Patent
Jager et al.

(10) Patent No.: US 10,887,825 B2
(45) Date of Patent: Jan. 5, 2021

(54) METHOD AND SYSTEM FOR APPLICATION-BASED ACCESS CONTROL USING NETWORK SLICING

(71) Applicant: Verizon Patent and Licensing Inc., Arlington, VA (US)

(72) Inventors: Frank Jager, Chester, NJ (US); Sudhakar Reddy Patil, Flower Mound, TX (US); Kristen Sydney Young, Morris Plains, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/400,349

(22) Filed: May 1, 2019

(65) Prior Publication Data
US 2020/0351756 A1    Nov. 5, 2020

(51) Int. Cl.
| | |
|---|---|
| *H04W 48/06* | (2009.01) |
| *H04W 28/12* | (2009.01) |
| *H04W 48/00* | (2009.01) |
| *H04W 48/10* | (2009.01) |
| *H04W 28/02* | (2009.01) |

(52) U.S. Cl.
CPC ....... *H04W 48/06* (2013.01); *H04W 28/0284* (2013.01); *H04W 28/12* (2013.01); *H04W 48/10* (2013.01); *H04W 48/17* (2013.01)

(58) Field of Classification Search
None
See application file for complete search history.

(56) References Cited

U.S. PATENT DOCUMENTS

| | | | |
|---|---|---|---|
| 2019/0174536 A1* | 6/2019 | Han | H04W 74/0833 |
| 2020/0178158 A1* | 6/2020 | Won | H04W 48/18 |

OTHER PUBLICATIONS

3GPP TS 22.261 V16.6.0 (Dec. 2018). 3rd Generation Partnership Project; Technical Specification Group Services and System Aspects; Service requirements for the 5G system; Stage 1 (Release 16), 73 pages.
3GPP TS 23.501 V15.4.0 (Dec. 2018). 3rd Generation Partnership Project; Technical Specification Group Services and System Aspects; System Architecture for the 5G System; Stage 2 (Release 15), 239 pages.

(Continued)

*Primary Examiner* — Adnan Baig

(57) ABSTRACT

A method, a device, and a non-transitory storage medium are described in which an application-based access control service is provided. The service assigns network slice priority values to network slices that are associated with an application or a portion of an application pertaining to end devices. The service calculates a network slice priority value to manage access barring based on a congestion level, and transmits the network slice priority value to end devices. End devices may determine whether access is permitted or not based on the network slice priority value and the assigned network slice priority values associated with the network slices. The service further provides access barring information to network devices of an access network that allows the network devices to reject connection requests and release existing connections. The access barring information may include a network slice priority value and/or network slice identifiers.

20 Claims, 21 Drawing Sheets

(56) References Cited

OTHER PUBLICATIONS

3GPP TS 38.304 V15.2.0 (Dec. 2018). 3rd Generation Partnership Project; Technical Specification Group Radio Access Network; NR; User Equipment (UE) procedures in Idle mode and RRC Inactive state (Release 15), 29 pages.
3GPP TS 38.331 V15.4.0 (Dec. 2018). 3rd Generation Partnership Project; Technical Specification Group Radio Access Network; NR; Radio Resource Control (RRC) protocol specification (Release 15), 475 pages.

\* cited by examiner

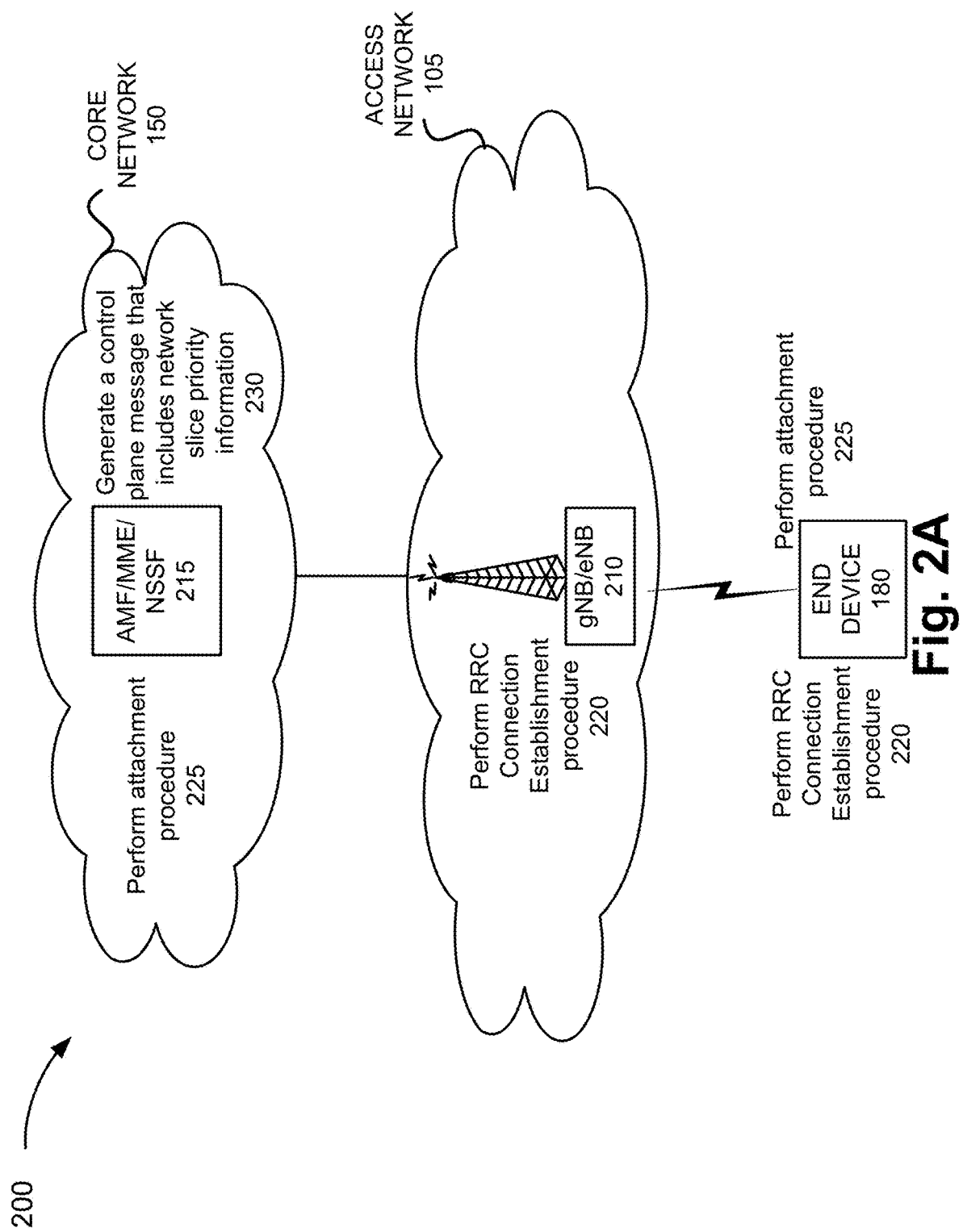

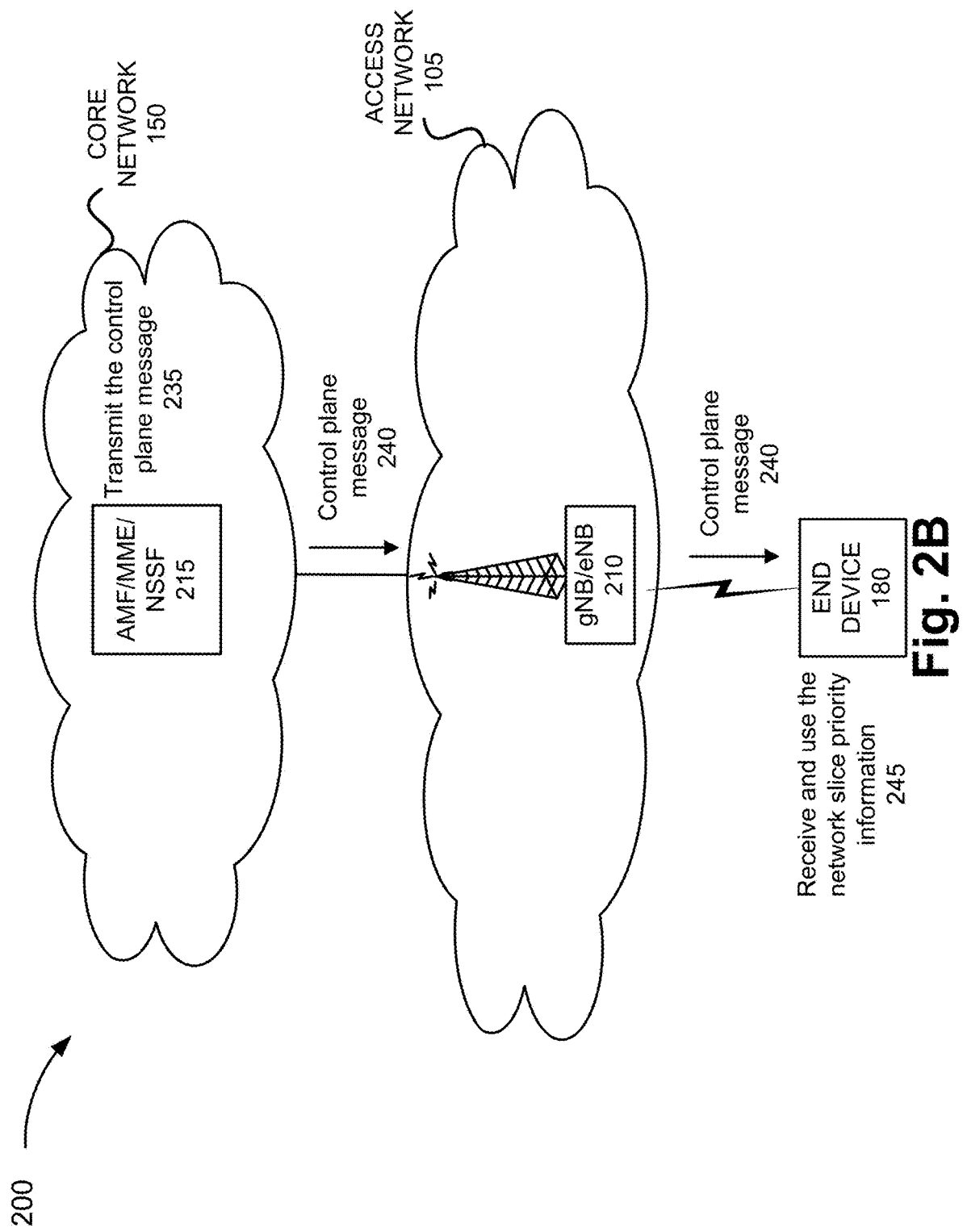

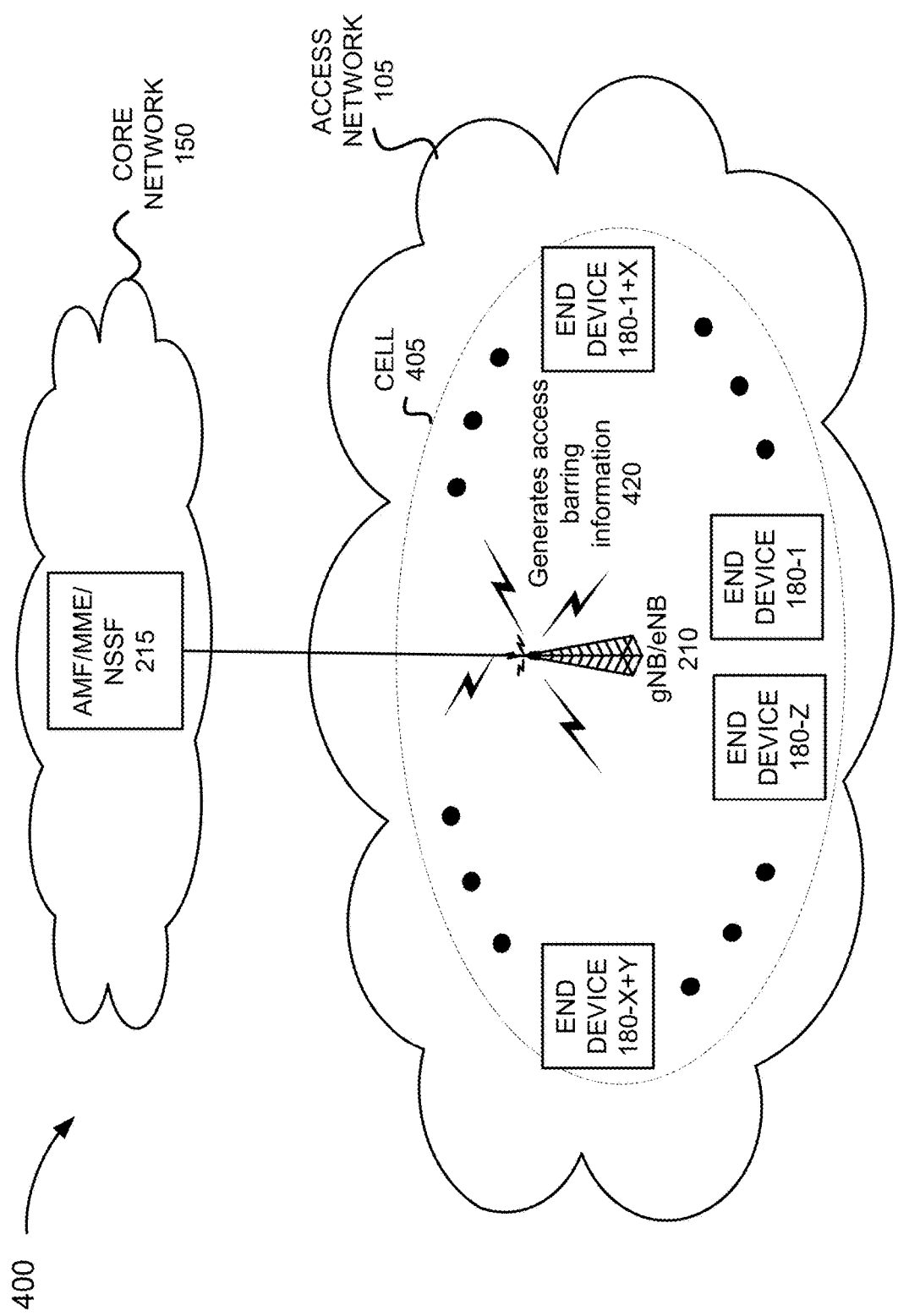

| LEGACY BARRING | APPLICATION-BASED BARRING | |
| --- | --- | --- |
| | ACTIVATED | DEACTIVATED |
| ACTIVATED | Follow configured rule/policy | Follow Legacy barring |
| DEACTIVATED | Follow Application-based barring | N/A |

```
┌─────────────────────────────────────────────────────────┐
│  RECEIVE A BROADCAST MESSAGE THAT INCLUDES A NETWORK    │
│                  SLICE PRIORITY VALUE                   │
│                          1205                           │
└─────────────────────────────────────────────────────────┘
                             │
                             ▼
┌─────────────────────────────────────────────────────────┐
│  DETERMINE AN APPLICATION THAT HAS PENDING DATA TO      │
│     TRANSMIT OR REASON TO ACCESS THE NETWORK            │
│                          1210                           │
└─────────────────────────────────────────────────────────┘
                             │
                             ▼
┌─────────────────────────────────────────────────────────┐
│  IDENTIFY SLICE PRIORITY LEVEL OF THE APPLICATION       │
│  ASSOCIATED WITH S-NSSAI, AND COMPARE WITH NETWORK      │
│               SLICE PRIORITY VALUE                      │
│                          1215                           │
└─────────────────────────────────────────────────────────┘
                             │
                             ▼
┌─────────────────────────────────────────────────────────┐
│  DETERMINE WHETHER THE APPLICATION IS BARRED OR NOT     │
│          BASED ON A RESULT OF THE COMPARISON            │
│                          1220                           │
└─────────────────────────────────────────────────────────┘
```

Fig. 12

METHOD AND SYSTEM FOR APPLICATION-BASED ACCESS CONTROL USING NETWORK SLICING

BACKGROUND

Development and design of radio access networks (RAN) and core networks present certain challenges from a network-side perspective and an end device perspective. For example, depending on the configurations from both network-side and end device-side perspectives, such configurations may reduce the effective use of resources. Accordingly, a need exists to overcome these challenges.

BRIEF DESCRIPTION OF THE DRAWINGS

FIGS. 2A-2B are diagrams illustrating an exemplary process of an exemplary embodiment of the application-based access control service;

FIGS. 4A-4G are diagrams illustrating another exemplary process of an exemplary embodiment of the application-based access control service;

FIG. 6 is a diagram illustrating exemplary data pertaining to legacy and application-based barring;

FIGS. 10-14 are flow diagrams illustrating exemplary processes of exemplary embodiments of the application-based access control service.

DETAILED DESCRIPTION OF PREFERRED EMBODIMENTS

Figure 1:
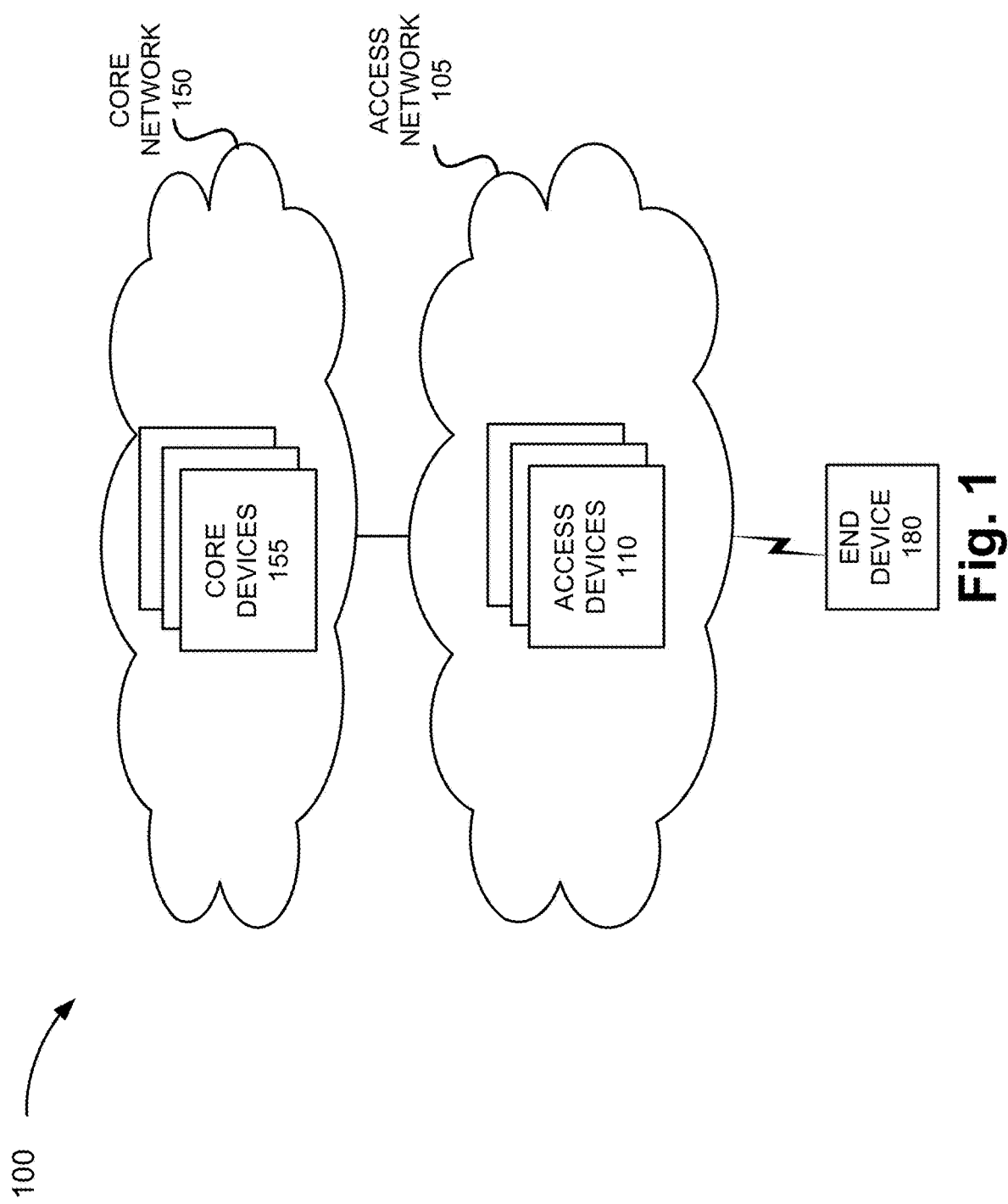
FIG. 1 is a diagram illustrating an exemplary environment in which an exemplary embodiment of an application-based access control service may be implemented.

The following detailed description refers to the accompanying drawings. The same reference numbers in different drawings may identify the same or similar elements. Also, the following detailed description does not limit the invention.

Various access control methods can manage admission control of end devices to a wireless network, such as access class barring (ACB) (e.g., barring access classes 0-9, differentiating call accesses based on multimedia telephone (MMTEL) traffic type), ACB with access class (AC) differentiation (e.g., differentiating access classes 11-15 relative to access classes 0-9), and ACB with emergency AC differentiation (e.g., differentiating access class 10 from other access classes). These methods fundamentally operate at a per-device or per-subscriber level in which a class is assigned to a device and/or subscriber to control its ability to access the wireless network. However, in view of the wide range of applications an end device may use, access control at the per-device or per-subscriber level can lead to undesirable results. For example, a high priority end device that has a low priority application running on it should not gain access (e.g., should be barred) to a congested RAN.

According to exemplary embodiments, an application-based access control service is described. According to an exemplary embodiment, the access control service assigns network slice priority levels to network slices that are mapped or correlated to applications or a portion of an application (e.g., not all functions of the application, such as a function of multiple functions) and transmits network slice priority information to end devices. According to an exemplary embodiment, a network device of a core network includes logic that provides the access control service. For example, the network device may include an access and mobility management function (AMF). According to other examples, the network device may include a mobility management entity (MME) or a network slice selection function (NSSF). According to still another example, the network device may include another type of network device of a core network that is able to communicate directly or indirectly to an end device.

According to an exemplary embodiment, the network device assigns a network slice priority for each single Network Slice Selection Assistance Information (S-NSSAI). According to an exemplary embodiment, the network device may be pre-configured with network slice priority information. For example, the network device may obtain network slice priority information via a management plane configuration. According to another exemplary embodiment, the network device may derive the network slice priority information from a field (e.g., slice differentiator (SD) field or another field) of the S-NSSAI.

According to an exemplary embodiment, the application-based access control service transmits access barring information to end devices. For example, the access barring information may be broadcast in a system information block (SIB) message or another type of broadcast message. According to an exemplary embodiment, the access barring information includes a network slice priority value, as described herein. According to another exemplary embodiment, the access barring information includes data indicating whether application-based barring is activated or not activated, and when activated, a network slice priority value. The network slice priority value indicates what network slices and corresponding applications or portions of applications are granted access and what network slices and corresponding applications or portions of applications are not granted access (e.g., barred) to the network. According to an exemplary embodiment, the end device receives the access barring information. When application-based barring is activated, the end device may identify the assigned network slice priority for an S-NSSAI pertaining to an application or a portion of an application that has pending data. The end device may compare the assigned network slice priority to the network slice priority value. Depending on the result of the comparison, the end device may be barred or granted access to the network based on the application or portion of the application.

According to an exemplary embodiment, the access barring information may include data indicating that an application or portion of the application that would otherwise be barred from accessing the network may be granted access (e.g., tag along) with another application or a portion of the other application that satisfies the network slice priority value.

According to an exemplary embodiment, the application-based access control service provides that the network device may control application access via a network slice based on congestion levels at the network device. For example, an AMF may transmit a control plane message to a radio access network device (e.g., a next generation Node B (gNB) or another type of wireless station of a RAN) indicating a network slice priority value. The radio access network device may reject radio connection requests and/or release existing radio connections pertaining to S-NSSAIs, network slice priorities and associated applications (or portions of applications) that do not satisfy the network slice priority value.

According to an exemplary embodiment, the application-based access control service may control access (e.g., grant access or bar) of an end device to an access network and/or a network slice of a particular radio access technology (RAT) on a per end device basis. According to another exemplary embodiment, the application-based access control service may control access of an end device to an access network and/or a network slice in a multi-RAT context on a per end device basis.

As a result, the access control service may improve network resource utilization in a network. For example, the access control service may improve the use of various network resources (e.g., physical, logical, virtual, radio) in relation to network devices of a RAN or network devices of the RAN and a core network based on the application level differentiation among end devices and users. As a result, the access control service may improve quality of service and minimize unnecessary congestion. Additionally, the access control service may improve resource utilization and quality of service at the end device for similar reasons.

FIG. 1 is a diagram illustrating an exemplary environment 100 in which an exemplary embodiment of the application-based access control service may be implemented. As illustrated, environment 100 includes an access network 105 and a core network 150. Access network 105 includes access devices 110, and core network 150 includes core devices 155. Environment 100 further includes an end device 180.

The number, the type, and the arrangement of network devices in access network 105 and core network 150, as illustrated and described, are exemplary. The number of end devices 180 is exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture.

Environment 100 includes communication links between the network devices, and between end device 180 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the application-based access control service may use at least one of these planes of communication. Additionally, an interface of a network device may be modified in order to support the communication (e.g., transmission and reception of messages, information elements (IE), attribute value pairs (AVPs), etc.) between network devices and the application-based access control service, as described herein. According to various exemplary implementations, the interface may be a service-based interface or a reference point-based interface.

Access network 105 may include one or multiple networks of one or multiple types and technologies. For example, access network 105 may include a Fourth Generation (4G) RAN, a 4.5G RAN, a Fifth Generation (5G) RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, a next generation (NG) RAN, and/or another type of RAN (e.g., a legacy RAN). Access network 105 may further include other types of wireless networks, such as a WiFi network, a Worldwide Interoperability for Microwave Access (WiMAX) network, a local area network (LAN), or another type of network that may provide an on-ramp to access devices 110 and/or core network 150.

According to various exemplary embodiments, access network 105 may be implemented to include various architectures of wireless service, such as, for example, macrocell, microcell, femtocell, picocell, metrocell, NR cell, LTE cell, non-cell, or another type of cell architecture. Additionally, according to various exemplary embodiments, access network 105 may be implemented according to various wireless technologies (e.g., radio access technology (RAT), etc.), wireless standards, wireless frequencies/bands/carriers, licensed radio spectrum, unlicensed radio spectrum, and/or other attributes of radio communication.

Access network 105 may include different and multiple functional splitting, such as options 1, 2, 3, 4, 5, 6, 7, or 8 that relate to combinations of access network 105 and core network 150 including an Evolved Packet Core (EPC) network and/or a NG core (NGC) network, or the splitting of the various layers (e.g., physical layer, Media Access Control (MAC) layer, Radio Link Control (RLC) layer, and Packet Data Convergence Control (PDCP) layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), network slicing, coordinated multipoint (CoMP), various duplex schemes (e.g., frequency division duplex (FDD), time division duplex (TDD), half-duplex FDD (H-FDD), etc.), and/or another type of connectivity service.

Depending on the implementation, access network 105 may include one or multiple types of network devices, such as access devices 110. For example, access devices 110 may include an evolved Node B (eNB), a next generation Node B (gNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. According to an exemplary embodiment, access device 110 includes logic that provides the application-based access control service, as described herein.

Core network 150 may include one or multiple networks of one or multiple types and technologies. According to an exemplary embodiment, core network 150 includes a complementary network of access network 105. For example, core network 150 may be implemented to include an EPC of an LTE, a core network of an LTE-Advanced (LTE-A) network, a core network of an LTE-A Pro network, and/or a next generation core (NGC) network. Core network 150 may include a legacy core network.

Depending on the implementation, core network 150 may include various types of network devices, such as core devices 155. For example, core devices 155 may include a packet gateway (PGW), a serving gateway (SGW), a home subscriber server (HSS), an authentication, authorization, and accounting (AAA) server, a policy charging and rules function (PCRF), a charging system (CS), a user plane function (UPF), an AMF, an MME, a session management function (SMF), a unified data management (UDM) device, an authentication server function (AUSF), a network slice selection function (NSSF), a network repository function (NRF), a policy control function (PCF), a network exposure function (NEF), and/or an application function (AF). According to other exemplary implementations, core devices 155 may include additional, different, and/or fewer network devices than those described. For example, core devices 155 may include a non-standard and/or proprietary network device. According to an exemplary embodiment, core device 155 includes logic that provides the application-based access control service, as described herein.

End device 180 includes a device that has computational and wireless communication capabilities. Depending on the implementation, end device 180 may be a mobile device, a portable device, a stationary device, a device operated by a user, or a device not operated by a user. For example, end device 180 may be implemented as a Mobile Broadband device, a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a user device, or other types of wireless end nodes. By way of further example, end device 180 may be implemented as a smartphone, a personal digital assistant, a tablet, a netbook, a phablet, a wearable device (e.g., a watch, glasses, etc.), a set top box, an infotainment system in a vehicle, a vehicle support system, a smart television, a game system, a music playing system, or other types of wireless end devices. End device 180 may be configured to execute various types of software (e.g., applications, programs, etc.). The number and the types of software may vary among end devices 180.

End device 180 may support one or multiple RATs (e.g., 4G, 5G, etc.) and various portions of the radio spectrum (e.g., multiple frequency bands, multiple carrier frequencies, licensed, unlicensed, etc.), network slicing, DC service, and/or other types of connectivity services. Additionally, end device 180 may include one or multiple communication interfaces that provide one or multiple (e.g., simultaneous) connections via the same or different RATs, frequency bands, carriers, network slices, and so forth. The multimode capabilities of end device 180 may vary among end devices 180. According to an exemplary embodiment, end device 180 includes logic that provides the application-based access control service, as described herein.

FIGS. 2A and 2B are diagrams illustrating an exemplary process of an exemplary embodiment of the application-based access control service. As illustrated, an environment 200, which is consistent with environment 100, includes access network 105 including a gNB/eNB 210 (e.g., access device 110), and core network 150 including an AMF/MME/NSSF 215 (e.g., core device 155). According to other exemplary embodiments, access device 110 and/or core device 155 may be a different type of network device.

Figure 3:
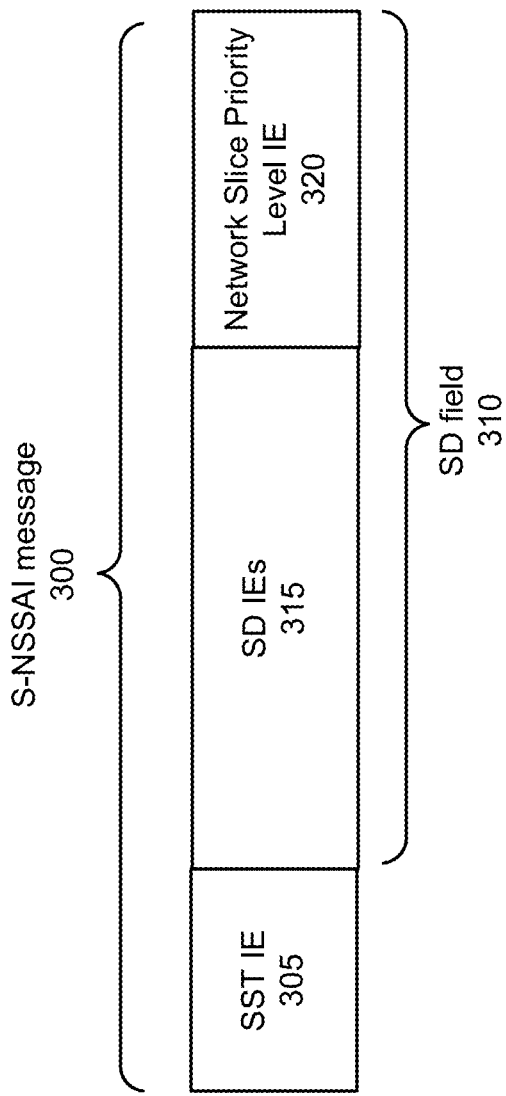
FIG. 3 is a diagram illustrating an exemplary embodiment of an exemplary message of the application-based access control service.

Referring to FIG. 2A, according to an exemplary scenario, assume that end device 180 establishes a Radio Resource Control (RRC) connection with gNB/eNB 210 based on an RRC Connection Establishment procedure 220. Subsequently, as a part of an attachment procedure 225 between end device 180 and core network 150, AMF/MME/NSSF 215 may generate a control plane message, which includes network slice priority information 230, pertaining to end device 180. For example, according to an exemplary embodiment, the control plane message may include an S-NSSAI message 300, as illustrated in FIG. 3. S-NSSAI message 300 may include a Slice Service Type (SST) information element (IE) 305 and a slice differentiator (SD) field 310. The SD field 310 may include SD IEs 315 and a network slice priority level IE 320. Network slice priority level IE 320 may include data indicating a network slice priority for each S-NSSAI. According to other examples, the network slice priority information may be included in another type of control plane message. As previously described, AMF/MME/NSSF 215 may generate the control plane message, which includes the network slice priority information, based on a management plane configuration or derived from a field (e.g., slice differentiator (SD) field or another field) of the S-NSSAI and/or other information (e.g., policy information from a PCF/PCRF, end device capability information, subscription information, or other information pertaining to end device 180).

Referring to FIG. 2B, in response to the generation of the control plane message, AMF/MME/NSSF 215 may transmit the control plane message 235 to end device 180. According to various examples, control plane message 240 may be included in a registration accept message or another type of message which may include allowed NSSAI and URSP. As illustrated, end device 180 may receive the control plane message via gNB/eNB 210, and use the network slice priority information 245 for access to the network.

FIGS. 2A and 2B illustrate an exemplary process of the application-based access control service, however, according to other exemplary embodiments, the process may include additional, different, and/or fewer steps, and/or include additional, different, and/or fewer messages. For example, according to an exemplary embodiment, end device 180 may be pre-configured with network slice priority information, as described herein. End device 180 may receive updates to the network slice priority information from core device 155 (e.g., AMF/MME/NSSF 215, etc.).

As previously described, the application-based access control service transmits access barring information to end devices. According to an exemplary embodiment, the access barring information includes a network slice priority value. According to another exemplary embodiment, the access barring information includes data indicating whether application-based barring is activated or not activated, and when activated, the network slice priority value. According to yet another exemplary embodiment, the access barring information includes data indicating that an application or portion of the application that would otherwise be barred from accessing the network (e.g., does not satisfy the network slice priority value) may be granted access (e.g., tag along) with another application or a portion of the other application that satisfies the network slice priority value. According to still another exemplary embodiment, the access barring information includes data indicating whether application-based barring is activated or not activated and whether legacy barring is activated or not activated.

FIGS. 4A-4G are diagrams illustrating another exemplary process of an exemplary embodiment of the application-based access control service. As illustrated, an environment 400 includes access network 105 including gNB/eNB 210 and core network 150 including AMF/MME/NSSF 215. gNB/eNB 210 may service a cell 405 that includes end devices 180-1 through 180-Z.

Figure 4A:
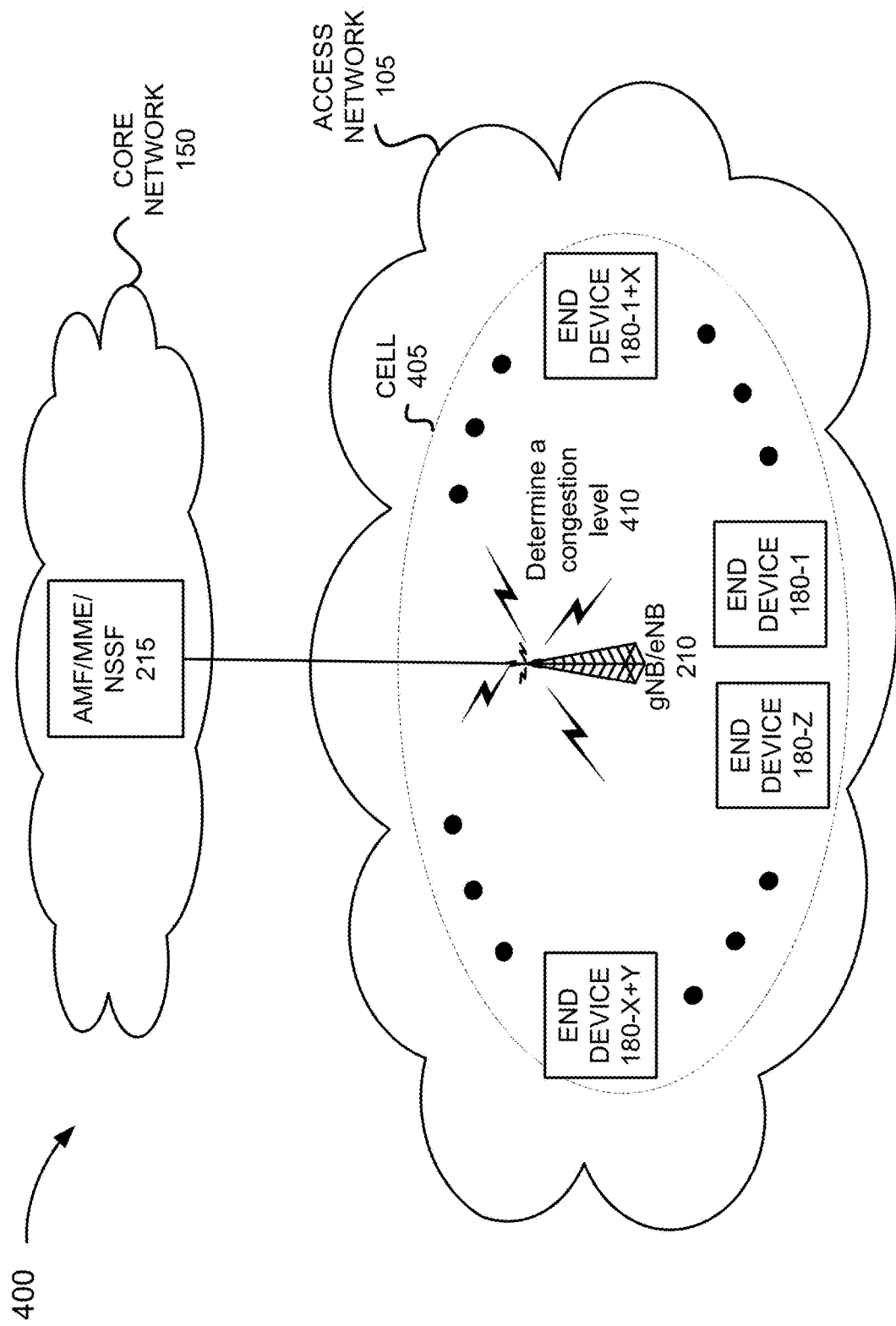

Referring to FIG. 4A, gNB/eNB 210 may determine a congestion level 410. For example, gNB/eNB 210 may evaluate load levels in relation to various network resources (e.g., physical (e.g., processor, communication interface, software, buffer memory, etc.), logical, virtual) including, for example, radio resources (e.g., physical resource blocks, radio spectrum, throughput in the uplink/downlink directions, uplink/downlink Guaranteed Bit Rates (GBRs)/non-GBRs, etc.), and/or other load levels pertaining to functional splits (e.g., interfaces, options, etc.), and network services (e.g., DC, CA, etc.), as described herein. gNB/eNB 210 may determine a congestion level and/or a predictive congestion level based on the evaluation. According to some exemplary implementations, gNB/eNB 210 may compare a load value to a congestion threshold parameter and value. As a result of the comparison, gNB/eNB 210 may determine a congestion level. According to some exemplary implementations, gNB/eNB 210 may monitor and measure other metrics, such as drop call rate, packet error rate, packet delay, handover statistics, cell capacity value, inter-cell interference, and/or other types measurements, criteria, values, indicators pertaining to cell 405, gNB/eNB 210 or access network 105.

Figure 4B:
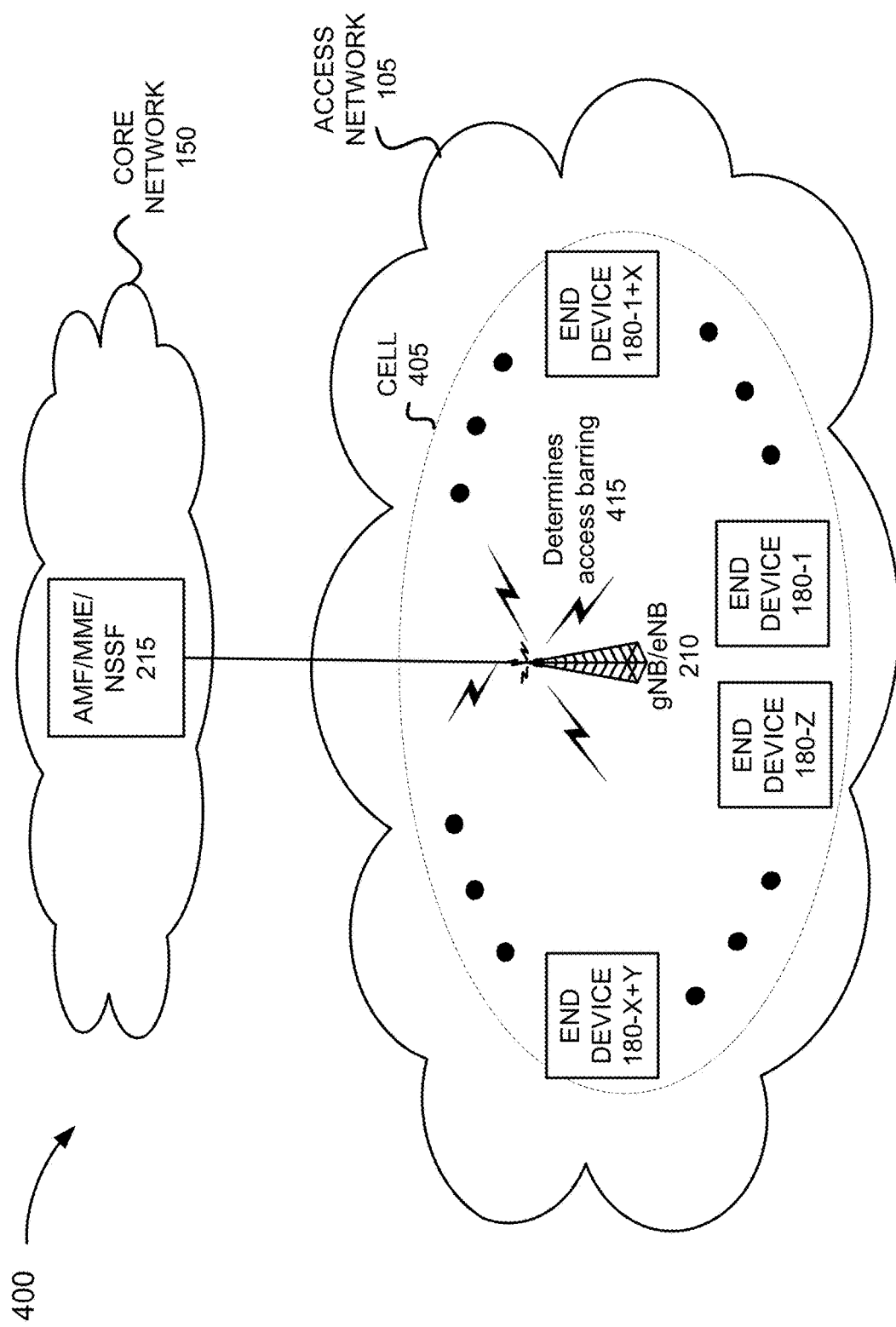

Referring to FIG. 4B, gNB/eNB 210 may determine a configuration for access barring 415. For example, gNB/eNB 210 may determine whether to use a legacy access control (e.g., ACB, ACB with access class differentiation, etc., as described herein), the application-based access control, or both. According to this exemplary scenario, assume that gNB/eNB 210 determines to use the application-based access control service, as described herein. This determination may be made based on a management plane configuration, or based on the congestion level (e.g., a degree of congestion).

Referring to FIG. 4C, gNB/eNB 210 may generate access barring information 420. For example, access barring information may include a slice priority value that indicates a lowest network slice priority level (and corresponding application or a portion of an application) that can access the network without barring. According to an exemplary embodiment, the mapping or the correlating of the slice priority value to a congestion level may be based on a category of an application or a portion of the application. For example, various categories of applications may be implemented, such as mission critical, real-time, non-real-time, machine-type communications (MTC), delay-tolerant, and/or another type of category that may be configured. Additionally, some applications may have multiple categories. For example, one function of an application may operate as a background service while another function of the same application may operate as an interactive/end user service. According to other exemplary embodiments, the mapping of the slice priority value to a congestion level may be based on other attributes pertaining to an application, such as amount of data to transmit/receive, type of traffic (e.g., intermittent traffic, burst traffic, continuous, etc.), a quality of service (QoS) attribute of the application and/or network slice, a specific band carrier, a specific carrier type (e.g., shared LTE/NR carrier, NR, LTE, etc.), and/or another type of configurable attribute associated with the application or the network slice.

Figure 4D:
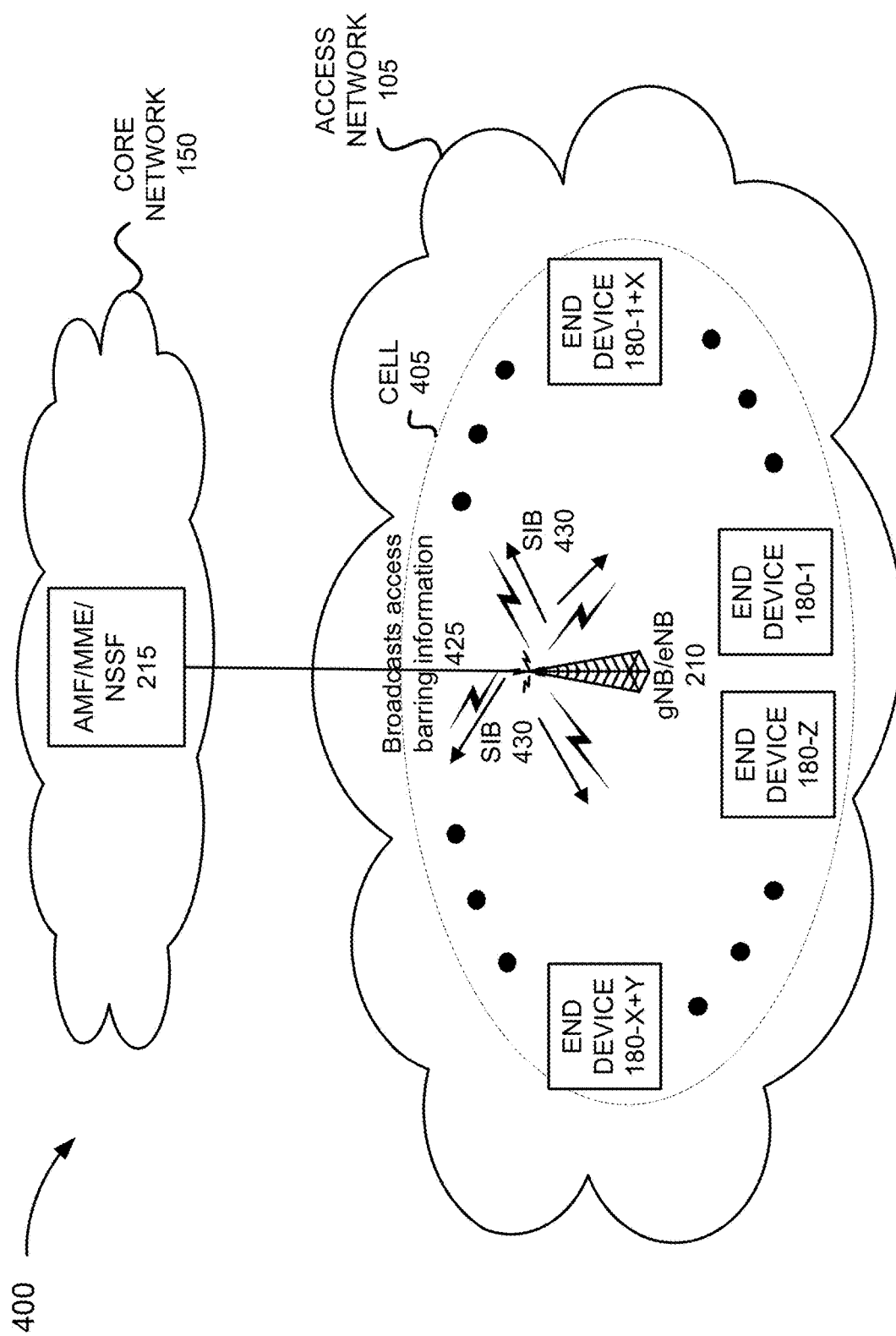

Referring to FIG. 4D, gNB/eNB 210 may generate a message that includes the access barring information, and broadcast the message. For example, the message may be a SIB message 430 or another type of message that may be broadcasted to end devices 180.

Figure 4E:
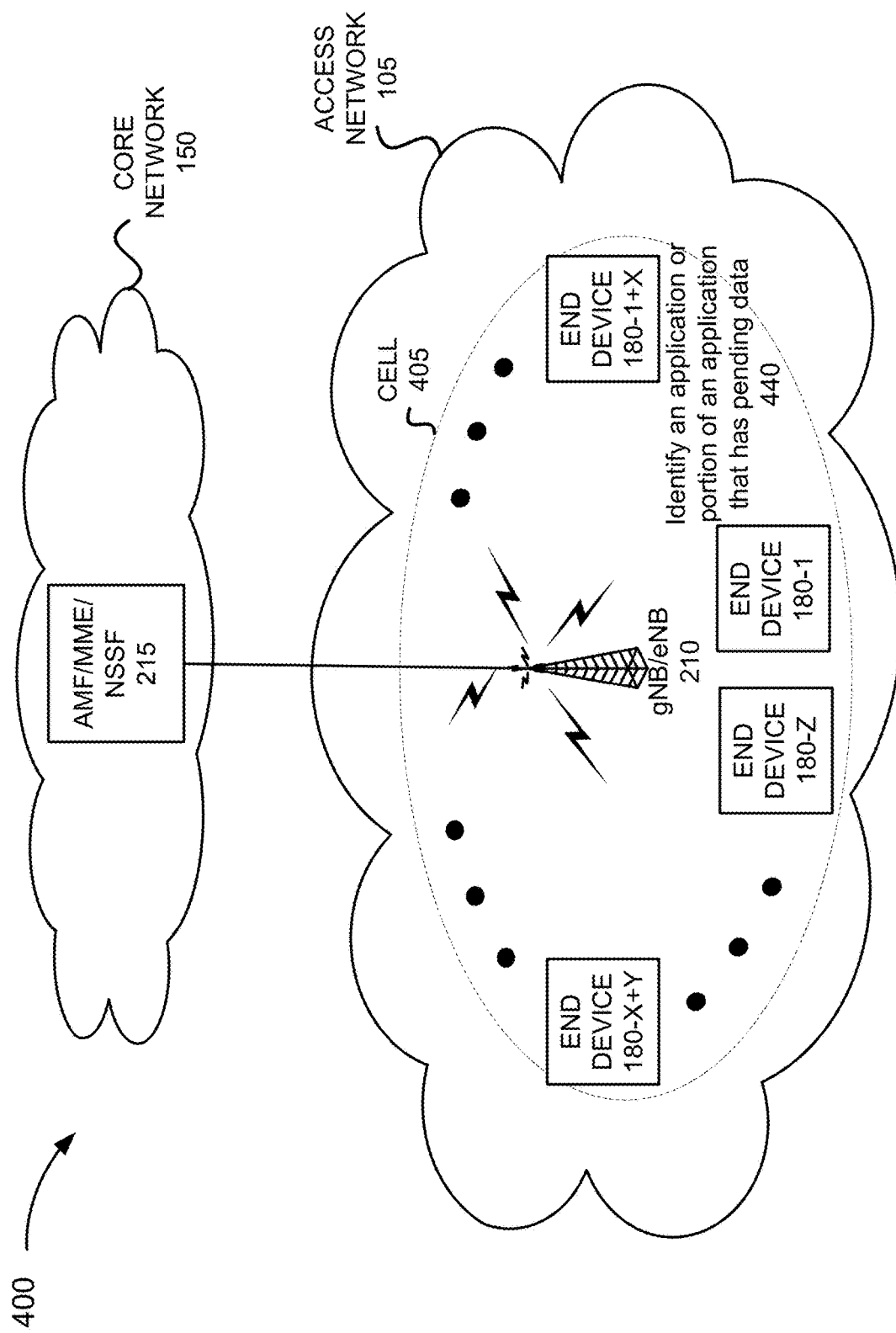

Referring to FIG. 4E, end device 180 may receive the message, and identify an application or a portion of an application that has pending data 440. As an example, some applications may have data to transmit, while other applications may not. According to this exemplary scenario, assume that an application or a function of an application has pending data to transmit. For those applications or functions of applications that have pending data, end device 180 may determine a network slice priority of the S-NSSAIs pertaining to the applications that have pending data.

Figure 4F:
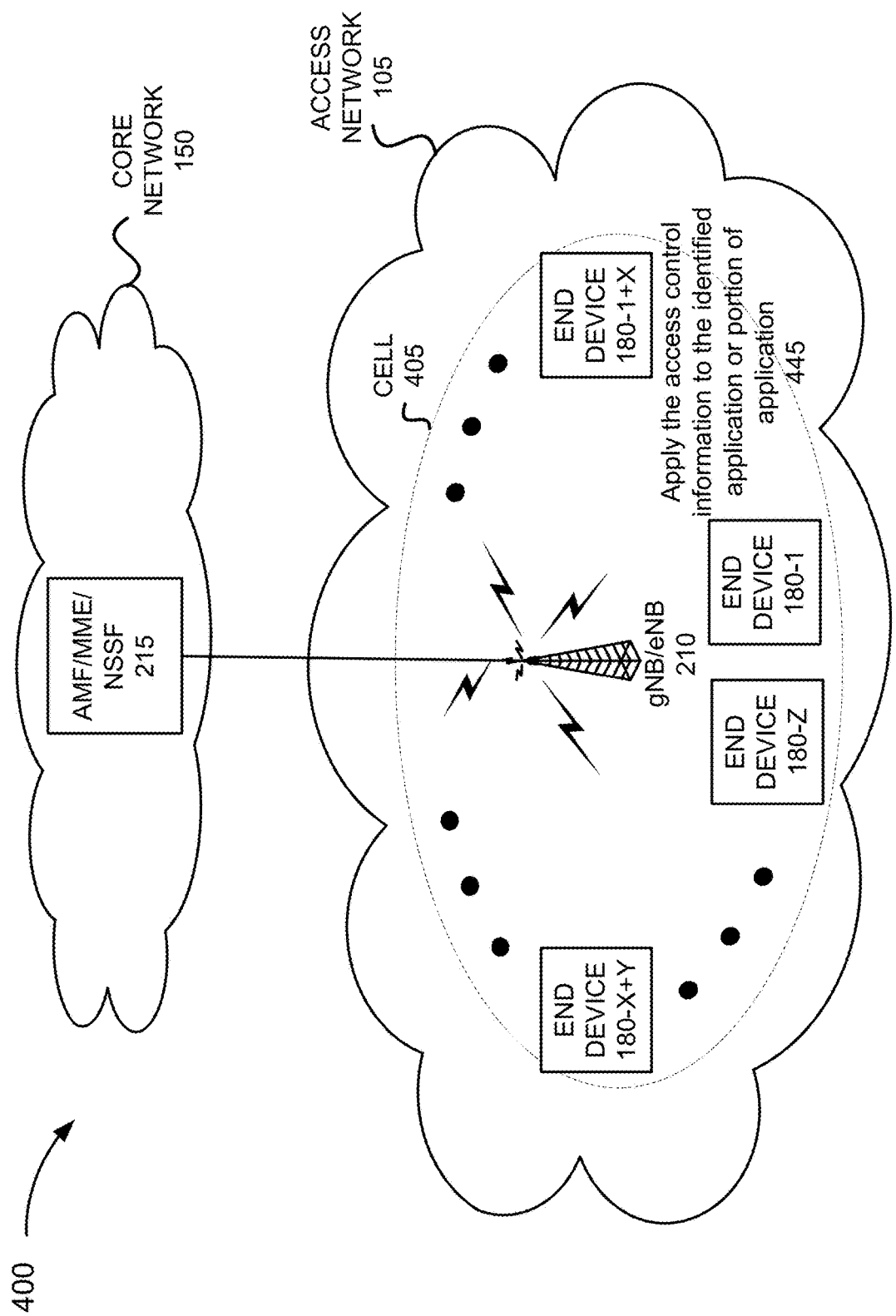
Figure 5:
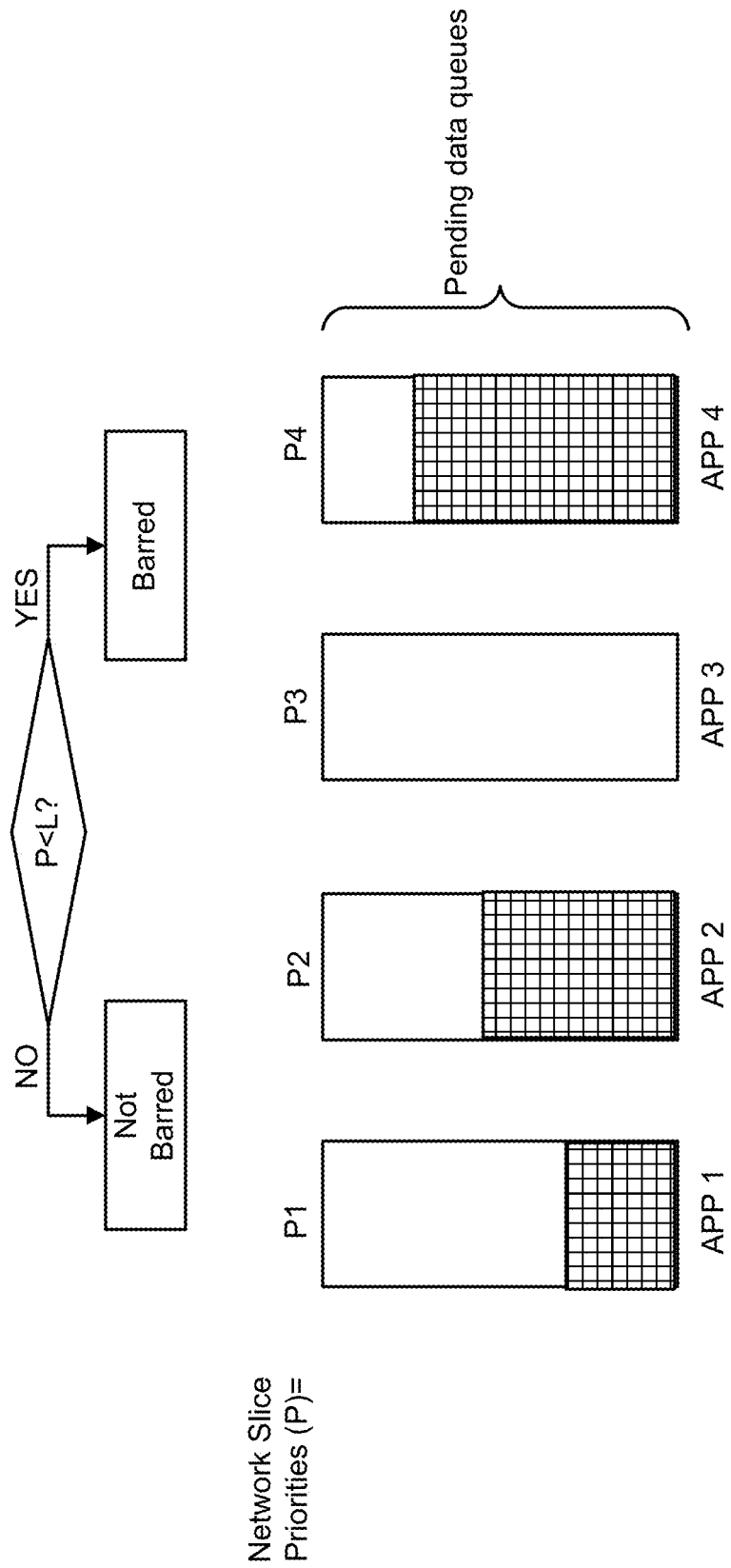
FIG. 5 is a diagram illustrating yet another exemplary process of an exemplary embodiment of the application-based access control service.

Referring to FIG. 4F, end device 180 may apply the access control information to the identified application or portion of the application 445. For example, end device 180 may compare that network slice priority to the network slice priority value included in the access barring information. For example, referring to FIG. 5, assume that end device 180 has applications 1-4 running in which applications 1, 2, and 4 have queues with pending data to transmit. End device 180 may determine the associated network slice priorities for S-NSSAIs of those applications, and compare the network slice priority (P) to the network slice priority value (L) included in the access barring information. When (P) is less than (L), the application or function may be barred and when (P) is greater than (L), the application or function may not be barred and end device 180 may execute procedures to schedule and transmit the pending data. According to an exemplary implementation, the per-application or portion of application comparison may be applied in a multi-RAT context or within a particular RAT context (e.g., a single RAT).

Figure 4G:
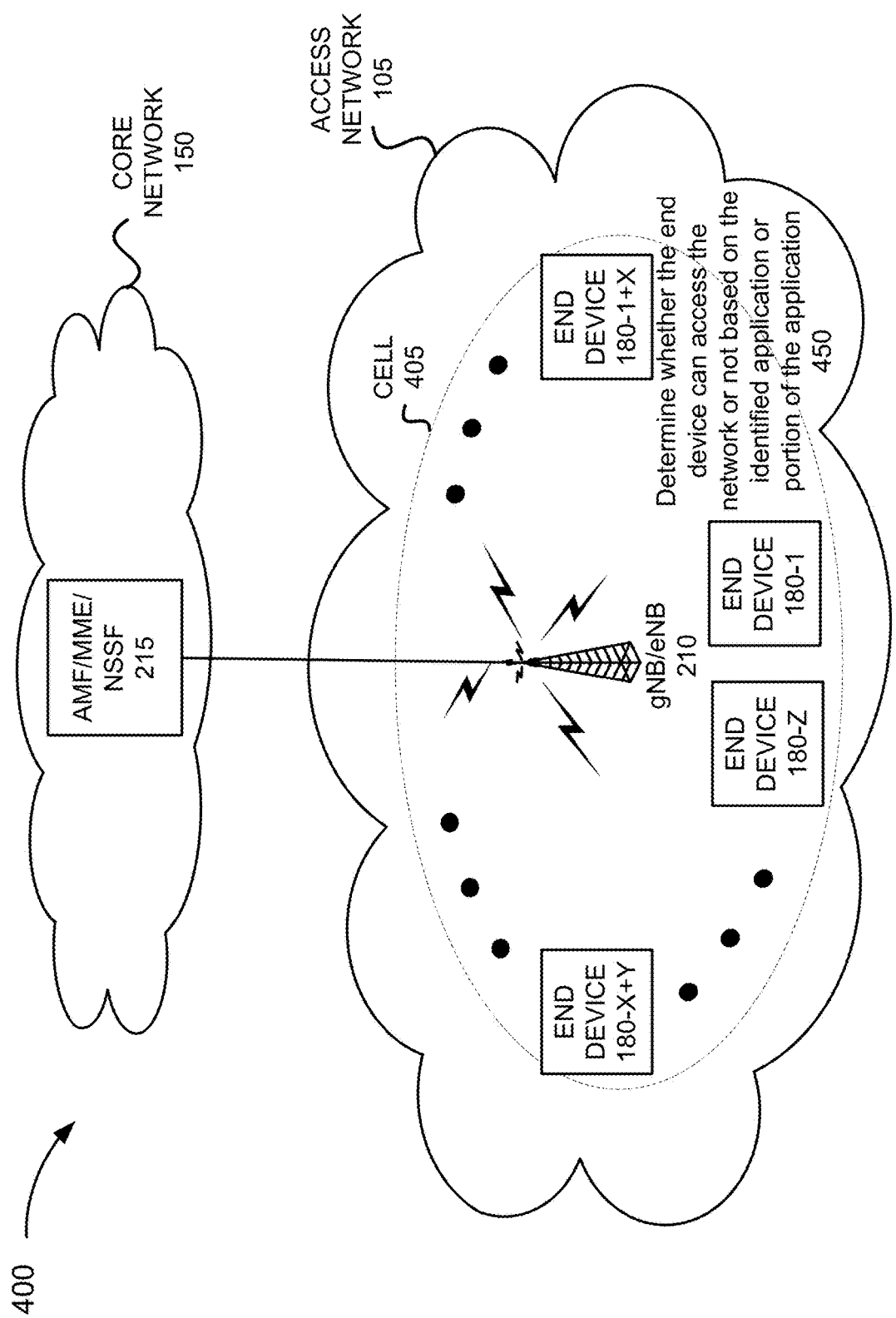

According to still other examples, end device 180 may select the application or portion of the application that has the highest priority (P) among the applications and/or portions of the applications, and compare that highest priority (P) to (L). In other words, a per-end device decision may be made based on the exemplary expression max (P)<L. According to an exemplary implementation, the per-end device decision may be applied to a particular RAT. Based on the result of the comparison, end device 180 may determine whether end device 180 may be granted access or not without comparing each priority (P) of each application or function that requests access to the network slice priority value (L). Referring to FIG. 4G, based on the result of the comparison, end device 180 may determine whether end device 180 can access the network or not based on the identified application or portion of the application 450. For example, application (1) may be barred, while application (2) and (4) may be granted access.

According to other examples, the comparison between (P) and (L) values or max (P) and (L) values may use different operations, such as ≤, ≥, >, etc., which yield the granting or denial of access.

FIGS. 4A-4G illustrate another exemplary process of the application-based access control service, however, according to other exemplary embodiments, the process may include additional, different, and/or fewer steps, and/or include additional, different, and/or fewer messages. For example, end device 180 may determine whether the application-based barring is activated and/or whether legacy barring is activated or not. Based on the state of each access barring mechanism (e.g., activated or deactivated), end device 180 may determine its access to the network. By way of further example, referring to FIG. 6, according to an exemplary configuration of a network (e.g., RAN, core), there may be legacy barring and application-based barring. As illustrated, when legacy barring is deactivated and application-based barring is activated, end device 180 may adhere to the application-based barring procedures associated with this service, and when legacy barring is activated and application-based barring is deactivated, end device 180 may adhere to the legacy barring procedures associated with that service.

When both legacy and application-based barring are activated, end device 180 may follow a rule or policy pertaining to that condition. For example, the rule/policy may provide that when end device 180 is barred by the legacy barring mechanism, end device 180 may determine whether access may be granted via the application-based barring service. Additionally, or alternatively, for example, when end device 180 is not barred by the legacy barring mechanism, end device 180 may ignore the application-based barring service. According to other examples, other policies or rules may be implemented to manage end device 180 when both legacy and application-based barring are activated. Additionally, when both legacy and application-based barring are not activated, end device 180 may not be prevented from accessing the network.

As previously described, the access barring information may include data indicating that an application or portion of the application that would otherwise be barred from accessing the network may be granted access (e.g., tag along) with another application or a portion of the other application that satisfies the network slice priority value. For example, referring back to FIG. 5, an application that has pending data but with a slice priority lower than L may be allowed to send data (e.g., tag along or piggyback) along with another application that has pending data but with a slice priority higher than L.

Figure 7:
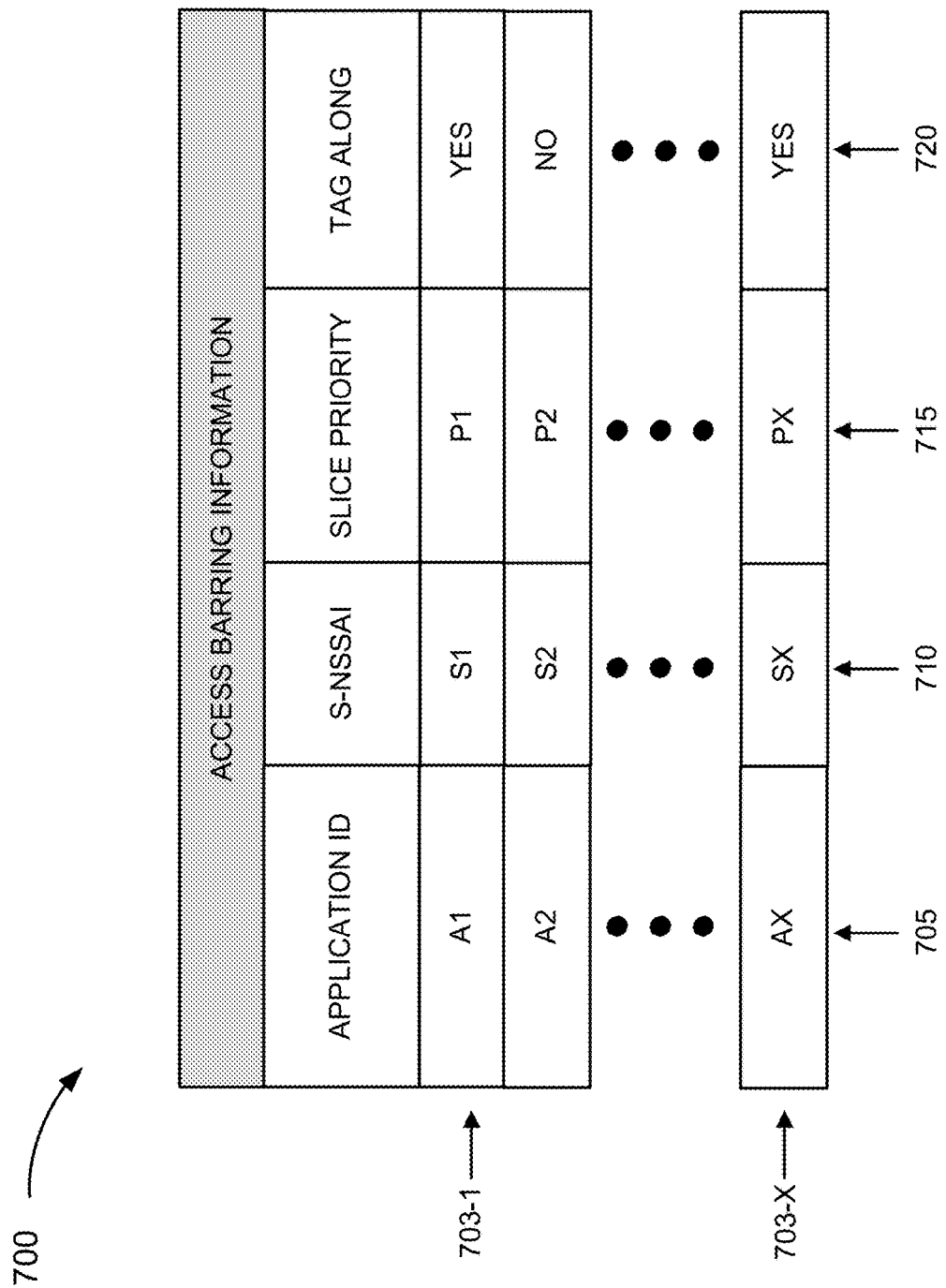
FIG. 7 is a diagram illustrating exemplary access barring information.

FIG. 7 is a diagram that illustrates exemplary access barring information that includes "tag along" data. As illustrated, a table 700 may include an application identifier (ID) field 705, an S-NSSAI field 710, and a slice priority field 715, and a tag along field 720. As further illustrated, table 700 includes records 703-1 through 703-X (also referred to as records 703, or individually or generally as record 703) that each includes a grouping of fields 705, 710, 715, and 720. The access barring information is illustrated in tabular form merely for the sake of description. In this regard, access barring information may be implemented in a data structure different from a table. The data fields and values are exemplary.

Application ID 705 may store an identifier that identifies an application or a portion of an application. S-NSSAI field 710 may store an identifier of a network slice associated with S-NSSAI. Slice priority field 715 may store a network slice priority value. Tag along field 720 may store data indicating whether or not end device 180 is permitted to or prohibited from using the tag along service.

According to other exemplary implementations, table 700 may store additional, fewer, and/or different instances of access barring information in support of the application-based access control service, as described herein. For example, access barring information may include one or multiple fields pertaining to whether the application-based access control service is activated, whether a legacy access control service is activated, etc. Access barring information may be dynamic over time, and end device 180 may update and store this data in response to receiving broadcast messages. Additionally, or alternatively, access barring information may be statically configured through policies conveyed to end device 180.

As previously described, the access control service provides that the network device may control application and network slice access based on congestion levels at the network device. For example, an AMF or an MME may transmit a control plane message to a radio access network device indicating a network slice priority value. The radio access network device may reject radio connection requests and/or release existing radio connections pertaining to S-NSSAIs, network slice priorities and associated applications (or portions of applications) that do not satisfy the network slice priority value.

Figure 8:
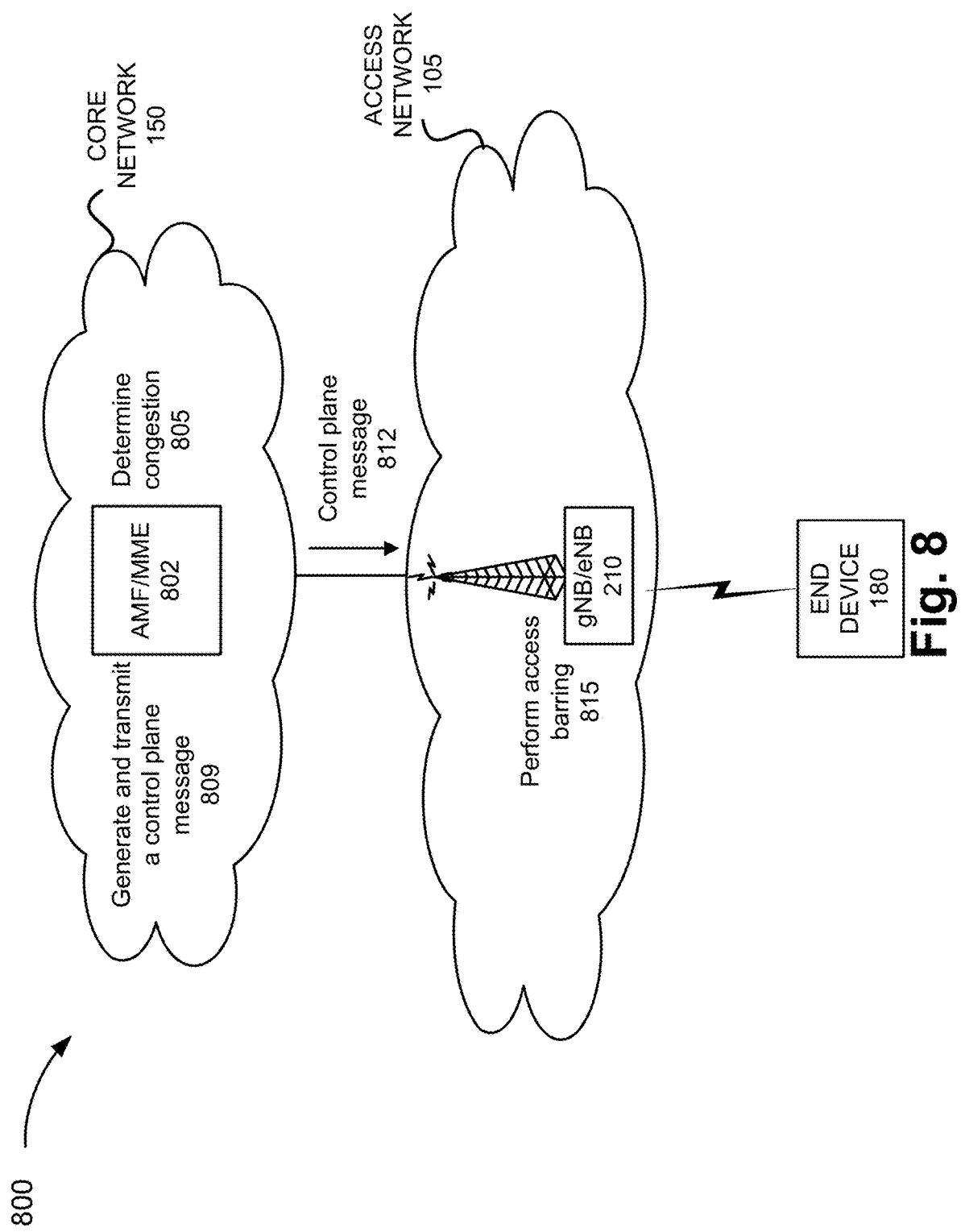
FIG. 8 is a diagram illustrating still another exemplary process of an exemplary embodiment of the application-based access control service.

Referring to FIG. 8, which illustrates an exemplary environment 800, an AMF/MME 802 may determine a congestion level 805. For example, the congestion level may pertain to the communication interface between AMF/MME 802 and gNB/eNB 210 or other types of resources (e.g., physical, logical, virtual, etc.), as described herein. In response, AMF/MME 802 may generate and transmit a control plane message 809 to gNB/eNB 210. For example, the control plane message 812 may include data indicating AMF/MME 802 is congested or similar indication (e.g., an overload start, etc.). Control plane message 812 may further include a network slice priority value (e.g., an L value, as previously described). The network slice priority value can be used by gNB/eNB 210 to reject radio access network signaling connection requests and release existing radio access network connections.

AMF/MME 802 may have access to data indicating network slice priority levels associated with S-NSSAIs, as previously described. AMF/MME 802 may use the per slice priority levels to generate a list of S-NSSAIs that access network 105 can use to reject access network signaling connection requests. AMF/MME 802 may include the list of S-NSSAIs in control plane message 812. AMF/MME 802 may further configure end device 180 (e.g., via signaling) to operate in an access stratum (AS) NSSAI inclusion mode when establishing an access network connection with access network 105. In this way, AMF/MME 802 may control what connection requests access network 105 (e.g., gNB/eNB 210) may reject based on the network slice information. Additionally, when congested or when there is a predicted congestion, AMF/MME 215 may take action with access network 105 at an application level.

In response to receiving control plane message 812, gNB/eNB 210 may perform an access barring procedure 815. According to an exemplary embodiment, gNB/eNB 210 may release existing radio connections and reject access network signaling connection requests from end device 180 based on the network slice priority value L. For example, network slices that have slice priority values below the network slice priority value received from AMF/MME 215 may be released. For example, gNB/eNB 210 may have access to data indicating network slice priority levels (e.g., management plane configuration, derivation from SD fields, etc.), as previously described. Additionally, or alternatively, gNB/eNB 210 may use the AS NSSAI, which is included in the access network signaling connection request in conjunction with the list of S-NSSAIs, to determine whether to reject an access network signaling connection request from end device 180. According to other exemplary embodiments, control plane message 812 may include distinct network slice priority values in which one network slice priority value pertains to the release of existing radio connections and the other pertains to the rejection of radio access network connection requests. gNB/eNB 210 may use the network slice priority values to manage the release and rejection of radio connections. According to still other exemplary embodiments, control plane message 812 may include multiple lists of S-NSSAIs in which one list may be used by gNB/eNB 210 for rejecting radio connection requests, and another list for releasing existing radio connections.

Although not illustrated, when AMF/MME 802 determines that AMF/MME 802 is no longer congested or the congestion level is at an acceptable level, AMF/MME 802 may generate and transmit another control plane message indicating the same (e.g., an overload stop, etc.). The control plane message may further include a new network slice priority value.

Figure 9:
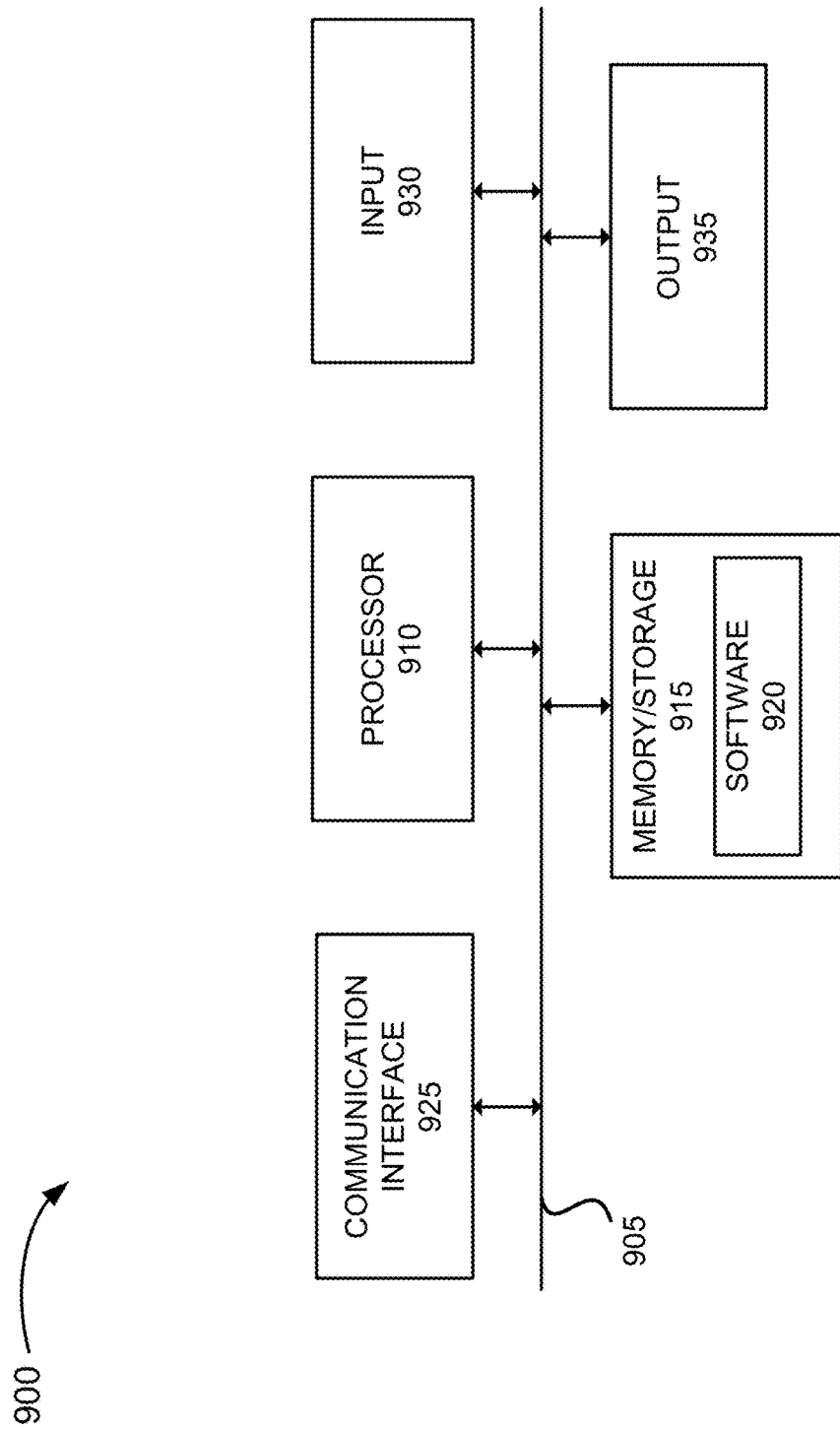
FIG. 9 is a diagram illustrating exemplary components of a device that may correspond to one or more of the devices illustrated and described herein.

FIG. 9 is a diagram illustrating exemplary components of a device 900 that may be included in one or more of the devices described herein. For example, device 900 may correspond to components included in access devices 110, core devices 155, end device 180, eNB 205, and gNB/eNB 210. As illustrated in FIG. 9, device 900 includes a bus 905, a processor 910, a memory/storage 915 that stores software 920, a communication interface 925, an input 930, and an output 935. According to other embodiments, device 900 may include fewer components, additional components, different components, and/or a different arrangement of components than those illustrated in FIG. 9 and described herein.

Bus 905 includes a path that permits communication among the components of device 900. For example, bus 905 may include a system bus, an address bus, a data bus, and/or a control bus. Bus 905 may also include bus drivers, bus arbiters, bus interfaces, clocks, and so forth.

Processor 910 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 910 may be implemented as hardware (e.g., a microprocessor, etc.), a combination of hardware and software (e.g., a SoC, an ASIC, etc.), may include one or multiple memories (e.g., cache, etc.), etc.

Processor 910 may control the overall operation or a portion of operation(s) performed by device 900. Processor 910 may perform one or multiple operations based on an operating system and/or various applications or computer programs (e.g., software 920). Processor 910 may access instructions from memory/storage 915, from other components of device 900, and/or from a source external to device 900 (e.g., a network, another device, etc.). Processor 910 may perform an operation and/or a process based on various techniques including, for example, multithreading, parallel processing, pipelining, interleaving, etc.

Memory/storage 915 includes one or multiple memories and/or one or multiple other types of storage mediums. For example, memory/storage 915 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 915 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 915 may include drives for reading from and writing to the storage medium.

Memory/storage 915 may be external to and/or removable from device 900, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 915 may store data, software, and/or instructions related to the operation of device 900.

Software 920 includes an application or a program that provides a function and/or a process. As an example, with respect to access device 110 (e.g., gNB/eNB 210, etc.), software 920 may include an application that, when executed by processor 910, provides a function of the application-based access control service, as described herein. Additionally, with reference to end device 180 or another network device (e.g., AMF/MME 215, etc.), software 920 may include an application that, when executed by processor 910, provides a function of the application-based access control service, as described herein. Software 920 may also include firmware, middleware, microcode, hardware description language (HDL), and/or other form of instruction. Software 920 may also be virtualized. Software 920 may further include an operating system (OS) (e.g., Windows, Linux, Android, proprietary, etc.).

Communication interface 925 permits device 900 to communicate with other devices, networks, systems, and/or the like. Communication interface 925 includes one or multiple wireless interfaces and/or wired interfaces. For example, communication interface 925 may include one or multiple transmitters and receivers, or transceivers. Communication interface 925 may operate according to a protocol stack and a communication standard. Communication interface 925 may include an antenna. Communication interface 925 may include various processing logic or circuitry (e.g., multiplexing/de-multiplexing, filtering, amplifying, converting, error correction, application programming interface (API), etc.). Communication interface 925 may be implemented as a point-to-point interface, a service based interface, etc.

Input 930 permits an input into device 900. For example, input 930 may include a keyboard, a mouse, a display, a touchscreen, a touchless screen, a button, a switch, an input port, speech recognition logic, and/or some other type of visual, auditory, tactile, etc., input component. Output 935 permits an output from device 900. For example, output 935 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 900 may be implemented in the same manner. For example, device 900 may be instantiated, spun up, spun down, or undergo a life-cycle, using well-known virtualization techniques in a public/private cloud or other type of network.

Device 900 may perform a process and/or a function, as described herein, in response to processor 910 executing software 920 stored by memory/storage 915. By way of example, instructions may be read into memory/storage 915 from another memory/storage 915 (not shown) or read from another device (not shown) via communication interface 925. The instructions stored by memory/storage 915 cause processor 910 to perform a process described herein. Alternatively, for example, according to other implementations, device 900 performs a process described herein based on the execution of hardware (processor 910, etc.).

Figure 10:
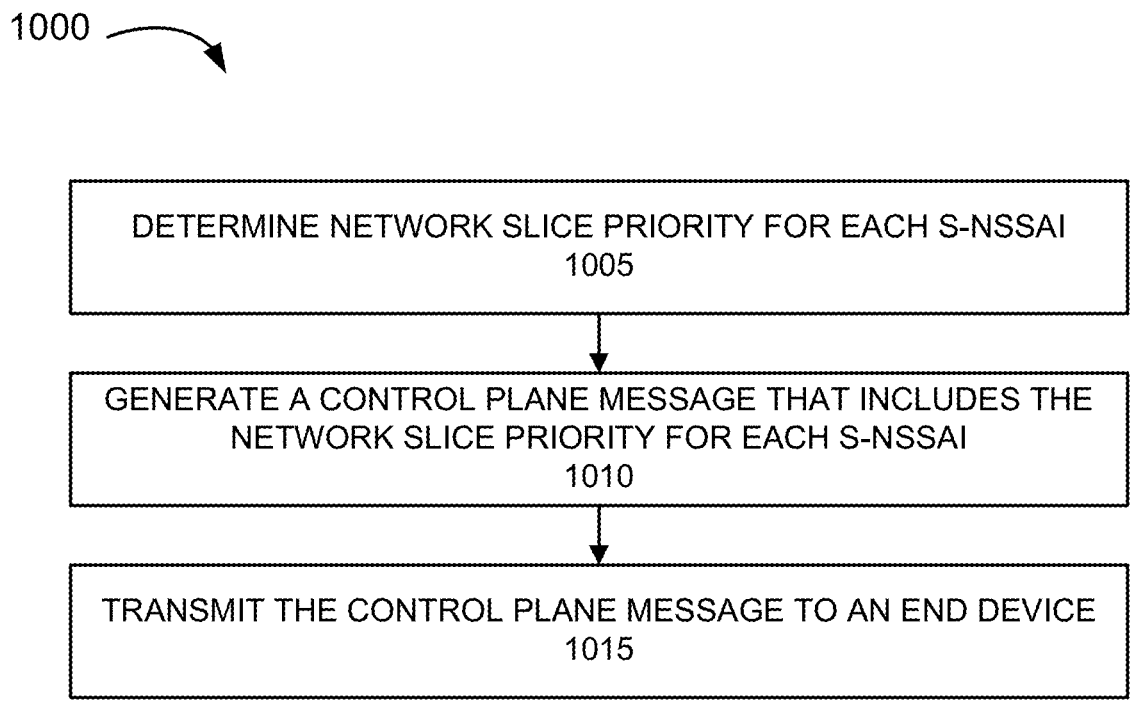

FIG. 10 is a flow diagram illustrating an exemplary process 1000 of an exemplary embodiment of the application-based access control service. According to an exemplary embodiment, a network device of core network 150 performs steps of process 1000. For example, the network device may be an AMF or an MME. Additionally, for example, processor 910 may execute software 920 to perform a step illustrated in FIG. 10 and described herein. Additionally, or alternatively, a step illustrated in FIG. 10 may be performed by execution of only hardware.

In block 1005, a network slice priority for each S-NSSAI may be determined. For example, the network device may determine a network slice priority based on a pre-configuration or derived based on data included in SD fields of the S-NSSAI.

In block 1010, a control plane message that includes the network slice priority information for each S-NSSAI may be generated. For example, the network device may generate a registration accept message or another type of control plane message pertaining to an attachment procedure or transmittal of URSP information to end device 180. For example, the network slice priority information may be included as part of S-NSSAI (e.g., SD bits).

In block 1015, the control plane message may be transmitted to an end device. For example, the network device may transmit the control plane message via an access device 110 to end device 180.

FIG. 10 illustrates an exemplary process 1000 of the application-based access control service, however, according to other embodiments, process 1000 may include additional operations, fewer operations, and/or different operations than those illustrated in FIG. 10, and described herein. For example, the network device may perform block 1005 in response to receiving a message from another network device (e.g., PCF, PCRF) during an attachment procedure. Additionally, for example, the network device may use other types of information (e.g., subscription information, end device capability information, etc.) to determine the network slice priority.

Figure 11:
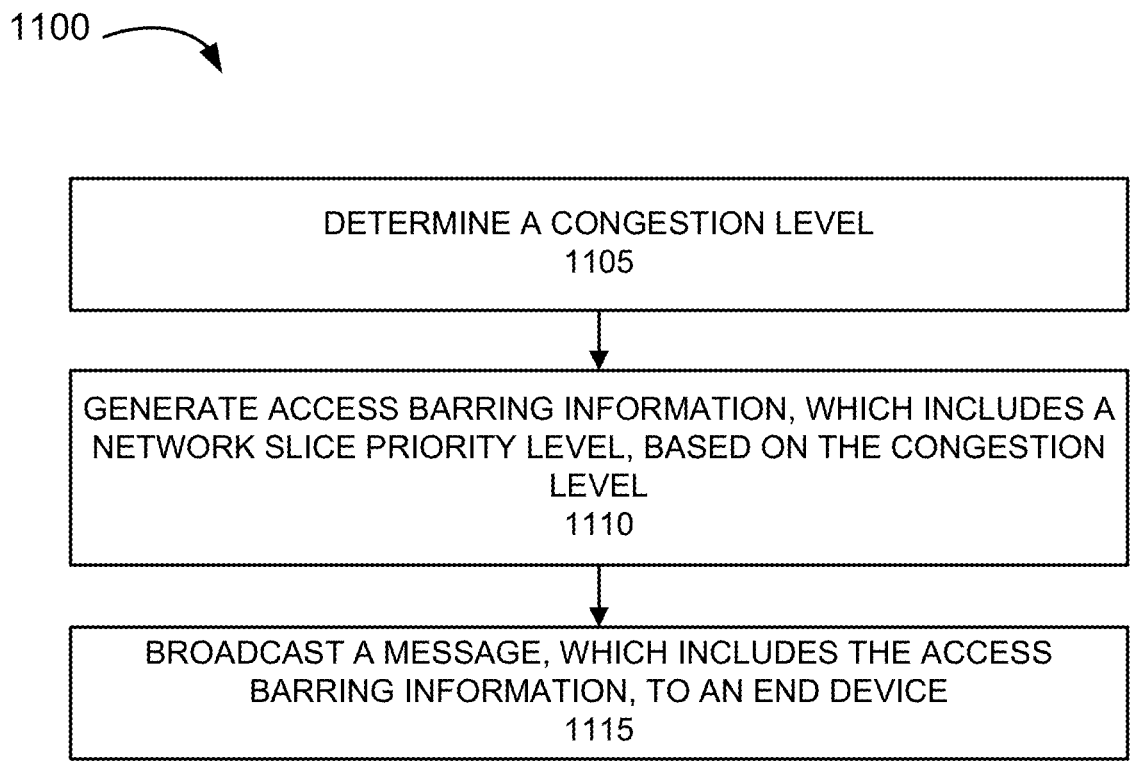

FIG. 11 is a flow diagram illustrating another exemplary process 1100 of an exemplary embodiment of the application-based access control service. According to an exemplary embodiment, a network device of access network 105 performs steps of process 1100. For example, the network device may be a gNB, an eNB, or another type of wireless station. Additionally, for example, processor 910 may execute software 920 to perform a step illustrated in FIG. 11 and described herein. Additionally, or alternatively, a step illustrated in FIG. 11 may be performed by execution of only hardware.

In block 1105, a congestion level may be determined. For example, the network device may determine a congestion level based on the load of one or multiple resources and/or types, as previously described.

In block 1110, access barring information, which includes a network slice priority value, may be generated based on the congestion level. For example, the network device may set the network slice priority value that provides a threshold for access and barring to the RAN for network slices and applications associated with end devices 180.

In block 1115, a message, which includes the access barring information, may be broadcast to an end device. For example, the network device may broadcast the access barring information to end devices 180.

FIG. 11 illustrates an exemplary process 1100 of the application-based access control service, however, according to other embodiments, process 1100 may include additional operations, fewer operations, and/or different operations than those illustrated in FIG. 11, and described herein. For example, as previously described, the network device may make other determinations relating to other types of data in addition to the network slice priority value to be included in the access barring information.

FIG. 12 is a flow diagram illustrating yet another exemplary process 1200 of an exemplary embodiment of the application-based access control service. According to an exemplary embodiment, end device 180 may perform the steps of process 1200. For example, processor 910 may execute software 920 to perform a step illustrated in FIG. 12 and described herein. Additionally, or alternatively, a step illustrated in FIG. 12 may be performed by execution of only hardware.

In block 1205, a broadcast message, which includes a network slice priority value, is received. For example, end device 180 receives the broadcast message from access device 110.

In block 1210, an application that has pending data to transmit or reason to access the network is determined. For example, end device 180 may determine whether an application of end device 180 has pending data to transmit or has another reason to access the network. For example, an application may be scheduled or triggered to access a server or other application-layer network device to perform some operation (e.g., fetch data, read data, process data, or perform some other function).

In block 1215, a slice priority level of the application associated with S-NSSAI may be identified, and the network slice priority value may be compared with the slice priority level. According to an exemplary embodiment, when multiple applications/portions of applications have reason to access the access network 105, end device 180 may identify the highest (P) value among the applications/portion of applications. According to another exemplary embodiment, the slice priority level for each application/portion of application may be selected. According to various exemplary embodiments, as previously described, end device 180 may compare a max (P) value to an (L) value or a (P) value to an (L) value.

In block 1220, it may be determined whether the application is barred or not based on a result of the comparison. For example, end device 180 may determine whether the slice priority level satisfies the threshold for gaining access to the RAN based on the result of the comparison with the network slice priority value. As previously described, end device 180 may determine on a per-end device basis or a per-application/portion of an application basis whether access is permitted or not.

FIG. 12 illustrates an exemplary process 1200 of the application-based access control service, however, according to other embodiments, process 1200 may include additional operations, fewer operations, and/or different operations than those illustrated in FIG. 12, and described herein. For example, as previously described, end device 180 may make other determinations relating to other types of data (e.g., tag along data) in addition to the network slice priority value included in the broadcast message.

Figure 13:
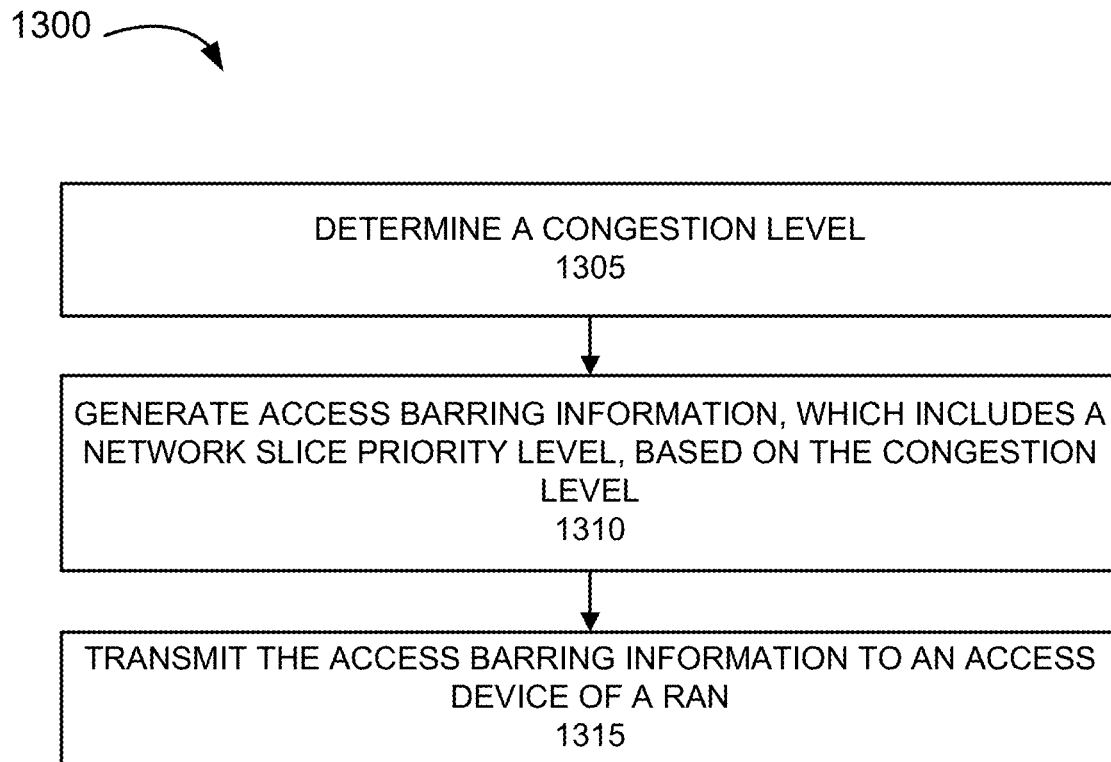

FIG. 13 is a flow diagram illustrating still another exemplary process 1300 of an exemplary embodiment of the application-based access control service. According to an exemplary embodiment, a network device of core network 150 performs the steps of process 1300. For example, the network device may be an AMF, an MME, or another type of network device of core network 150 that manages access and mobility of end device 180. Additionally, for example, processor 910 may execute software 920 to perform a step illustrated in FIG. 13 and described herein. Additionally, or alternatively, a step illustrated in FIG. 13 may be performed by execution of only hardware.

In block 1305, a congestion level may be determined. For example, the network device may determine a congestion level based on the load of one or multiple resources and/or types, as previously described.

In block 1310, access barring information, which includes a network slice priority value, may be generated based on the congestion level. For example, the network device may set the network slice priority value that provides a threshold for access device 110 to reject or allow radio connection requests and/or release existing radio connections, based on slice priority levels associated with S-NSSAI.

In block 1315, the access barring information may be transmitted to an access device of a RAN. For example, the network device may transmit the access barring information to a gNB, an eNB, or another type of wireless station of the RAN.

FIG. 13 illustrates an exemplary process 1300 of the application-based access control service, however, according to other embodiments, process 1300 may include additional operations, fewer operations, and/or different operations than those illustrated in FIG. 13, and described herein. For example, for block 1310, the access barring information may include the network slice priority value and a list of S-NSSAIs (e.g., for rejection of radio connection requests), or multiple lists, as previously described. Additionally, for example, process 1300 may include the network device enabling AS NSSAI inclusion mode at end device 180. For example, the network device may configure end device 180 as a part of an attachment procedure to core network 150 or another procedure subsequent to the attachment procedure with end device 180. Also, for example, process 1300 may be performed by a network device of a MEC network, a fog network, or other application layer network that has control plane signaling to access device 110 of access network 105.

Figure 14:
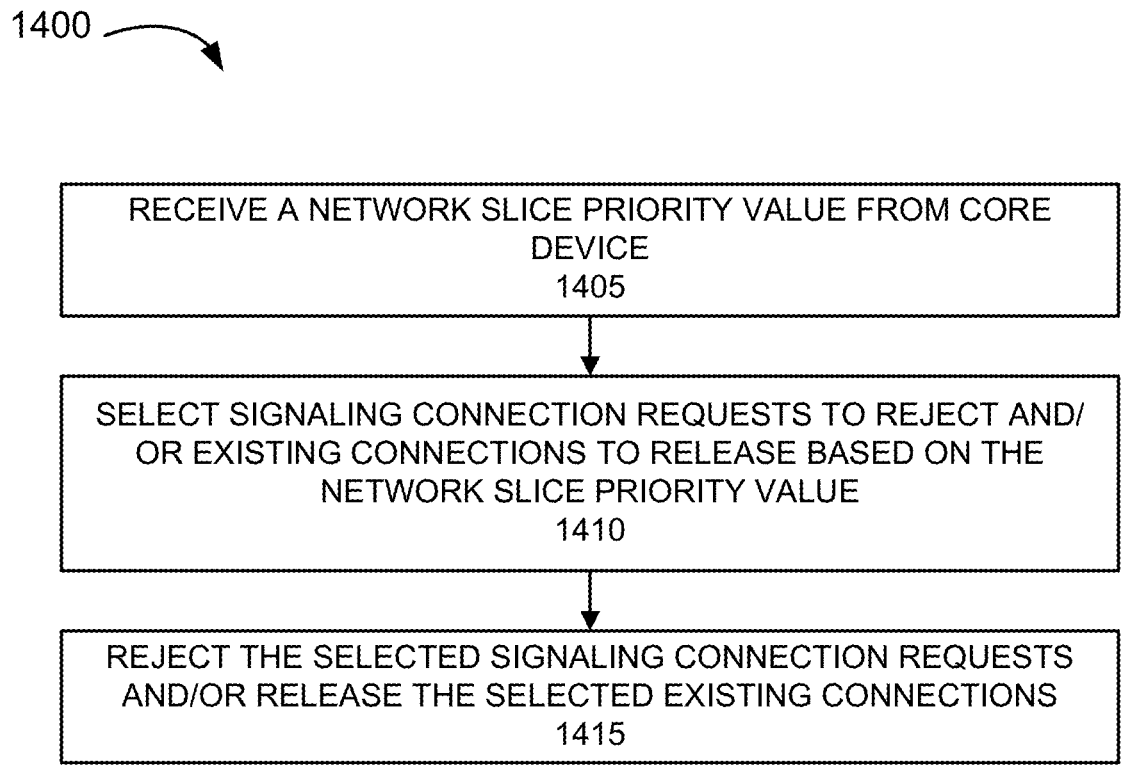

FIG. 14 is a flow diagram illustrating another exemplary process 1400 of an exemplary embodiment of the application-based access control service. According to an exemplary embodiment, an access device of access network 105 performs the steps of process 1400. For example, the access device may be a gNB, an eNB, or another type of access device of a RAN. Additionally, for example, processor 910 may execute software 920 to perform a step illustrated in FIG. 14 and described herein. Additionally, or alternatively, a step illustrated in FIG. 14 may be performed by execution of only hardware.

In block 1405, a network slice priority value may be received from a core device. For example, access device 110 may receive a control plane message (e.g., an overload start message, etc.), which includes the network slice priority value, from an AMF, an MME, or another network device of core network 150.

In block 1410, signaling connection requests to reject and/or existing connections to release may be selected based on the network slice priority value. For example, access device 110 may compare slice priorities associated with connection requests and/or existing connections to the network slice priority value.

In block 1415, the selected signaling connection requests may be rejected and/or the selected existing connections may be released. For example, access device 110 may reject connection requests and/or release existing connections.

FIG. 14 illustrates an exemplary process 1400 of the application-based access control service, however, according to other embodiments, process 1400 may include additional operations, fewer operations, and/or different operations than those illustrated in FIG. 14, and described herein. For example, access device 110 may receive subsequent control plane messages (e.g., overload stop message, etc.) that includes a new network slice priority value, and access device 110 may manage connection requests and existing connections accordingly.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive. According to other exemplary embodiments, the end device may determine whether an application or the portion of the application can access a network based on the wireless/radio technology to be used.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to processes illustrated in FIGS. 10-14, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 910, etc.), or a combination of hardware and software (e.g., software 920).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 910) of a device. A non-transitory storage medium includes one or more of the storage mediums described in relation to memory/storage 915.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
    determining, by a network device of a radio access network, a congestion level pertaining to one or more resources of the network device;
    generating, by the network device based on the congestion level, access barring information that includes a first threshold network slice priority value that indicates a threshold slice priority that is to be satisfied by network slice priority values assigned to network slices and at least one of correlated first applications or portions of the correlated first applications of one or more end devices so as to be granted access to and not barred from the network device, wherein the access barring information further includes tag along data indicating whether or not a first set of the at least one of the correlated first applications or the portions of the correlated first applications that are otherwise not granted access to the network device based on their corresponding one or more network slice priority values, are granted access when a second set of the at least one of the correlated first applications or the portions of the correlated first applications are granted access to the network device based on their corresponding one or more network slice priority values; and
    transmitting, by the network device, the access barring information to the one or more of the end devices.

2. The method of claim 1, wherein the access barring information further includes data indicating whether an application-based access control service is activated or not.

3. The method of claim 1, further comprising:
    mapping, by the network device, the congestion level to the first threshold network slice priority value.

4. The method of claim 1, further comprising:
    receiving, by the network device from a device of a core network that is in a congested state, a second threshold network slice priority value that indicates a threshold slice priority that is to be satisfied by the network slice priority values and the at least one of the correlated first applications or the portions of the correlated first applications so as to be granted access to the network device;
    determining, by the network device based on the second threshold network slice priority value, whether to at least one of reject a connection request from or release an existing connection with at least one of the one or more end devices;
    rejecting, by the network device in response to determining to reject, the at least one of the one or more end devices; and
    releasing, by the network device in response to determining to release, the at least one of the one or more end devices that has the existing connection.

5. The method of claim 1, further comprising:
    receiving, by the network device from a device of a core network that is in a congested state, a second threshold network slice priority value that indicates a threshold slice priority that is to be satisfied by the network slice priority values and the at least one of the correlated first applications or the portions of the correlated first applications so as to be granted access to the network device and one or more network slice identifiers;
    determining, by the network device based on the one or more network slice identifiers, whether to reject a connection request from at least one of the one or more end devices;
    determining, by the network device based on the second threshold network slice priority value, whether to release an existing connection with the at least one of the one or more end devices;
    rejecting, by the network device in response to determining to reject, the at least one of the one or more end devices; and releasing, by the network device in response to determining to release, the at least one of the one or more end devices that has the existing connection.

6. The method of claim 5, wherein the device is an access and mobility management function, and wherein the second network slice priority value and the one or more network slice identifiers are included in an overload start message.

7. The method of claim 1, wherein the network device is a next generation Node B (gNB), and the method further comprising:
providing, by the network device subsequent to the transmitting, access control of the one or more end devices and the at least one of the correlated first applications or the portions of the correlated first applications based on the first threshold network slice priority value and the network slice priority values.

8. The method of claim 1, wherein the transmitting comprises:
broadcasting, by the network device, the access barring information in a system information block message.

9. A network device comprising:
a communication interface;
a memory, wherein the memory stores instructions; and
a processor, wherein the processor executes the instructions to:
determine a congestion level pertaining to one or more resources of the network device of a radio access network;
generate, based on the congestion level, access barring information that includes a first threshold network slice priority value that indicates a threshold slice priority that is to be satisfied by network slice priority values assigned to network slices and at least one of correlated first applications or portions of the correlated first applications of one or more end devices so as to be granted access to and not barred from the network device, wherein the access barring information further includes tag along data indicating whether or not a first set of the at least one of the correlated first applications or the portions of the correlated first applications that are otherwise not granted access to the network device based on their corresponding one or more network slice priority values, are granted access when a second set of the at least one of the correlated first applications or the portions of the correlated first applications are granted access to the network device based on their corresponding one or more network slice priority values; and
transmit, via the communication interface, the access barring information to the one or more of the end devices.

10. The network device of claim 9, wherein the access barring information further includes data indicating whether an application-based access control service is activated or not.

11. The network device of claim 9, wherein the processor further executes the instructions to:
map the congestion level to the first threshold network slice priority value.

12. The network device of claim 9, wherein the processor further executes the instructions to:
receive, via the communication interface from a device of a core network that is in a congested state, a second threshold network slice priority value that indicates a threshold slice priority that is to be satisfied by the network slice priority values and the at least one of the correlated first applications or the portions of the correlated first applications so as to be granted access to the network device;
determine, based on the second threshold network slice priority value, whether to at least one of reject a connection request from or release an existing connection with at least one of the one or more end devices;
reject, in response to a determination to reject, the at least one of the one or more end devices; and
release, in response to a determination to release, the at least one of the one or more end devices.

13. The network device of claim 9, wherein the processor further executes the instructions to:
receive, via the communication interface from a device of a core network that is in a congested state, a second threshold network slice priority value that indicates a threshold slice priority that is to be satisfied by the network slice priority values and the at least one of the correlated first applications or the portions of the correlated first applications so as to be granted access to the network device and one or more network slice identifiers;
determine, based on the one or more network slice identifiers, whether to reject a connection request from at least one of the one or more end devices;
determine, based on the second threshold network slice priority value, whether to release an existing connection with the at least one of the one or more end devices;
reject, in response to a determination to reject, the at least one of the one or more end devices; and
release, in response to a determination to release, the at least one of the one or more end devices.

14. The network device of claim 13, wherein the device is an access and mobility management function, and wherein the second network slice priority value and the one or more network slice identifiers are included in an overload start message.

15. The network device of claim 9, wherein the network device is a next generation Node B (gNB), and wherein the processor further executes the instructions to:
provide, subsequent to the transmission, access control of the one or more end devices and the at least one of the correlated first applications or the portions of the correlated first applications based on the first network slice priority value and the network slice priority values.

16. The network device of claim 9, wherein, when transmitting, the processor further executes the instructions to:
broadcast, via the communication interface, the access barring information in a system information block message.

17. A non-transitory computer-readable storage medium storing instructions executable by a processor of a network device, which when executed cause the network device to:
determine a congestion level pertaining to one or more resources of the network device of a radio access network;
generate, based on the congestion level, access barring information that includes a first threshold network slice priority value that indicates a threshold slice priority that is to be satisfied by network slice priority values assigned to network slices and at least one of correlated first applications or portions of the correlated first applications of one or more end devices so as to be granted access to and not barred from the network device, wherein the access barring information further includes tag along data indicating whether or not a first set of the at least one of the correlated first applications or the portions of the correlated first applications that are otherwise not granted access to the network device based on their corresponding one or more network slice priority values, are granted access when a second set of the at least one of the correlated first applications or the portions of the correlated first applications are granted access to the network device based on their corresponding one or more network slice priority values; and transmit the access barring information to the one or more of the end devices.

18. The non-transitory computer-readable storage medium of claim 17, wherein the access barring information further includes data indicating whether an application-based access control service is activated or not.

19. The non-transitory computer-readable storage medium of claim 17, wherein the instructions further comprise instructions, which when executed cause the network device:

map the congestion level to the first threshold network slice priority value.

20. The non-transitory computer-readable storage medium of claim 17, wherein the network device is a next generation Node B (gNB), and wherein the instructions further comprise instructions, which when executed cause the gNB to:

provide, subsequent to the transmission, access control of the one or more end devices and the at least one of the correlated first applications or the portions of the correlated first applications based on the first network slice priority value and the network slice priority values.

* * * * *